United States Patent
Inoue

(10) Patent No.: US 11,926,314 B2
(45) Date of Patent: Mar. 12, 2024

(54) VEHICLE CONTROL APPARATUS

(71) Applicant: TOYOTA JIDOSHA KABUSHIKI KAISHA, Toyota (JP)

(72) Inventor: Kota Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 17/459,337

(22) Filed: Aug. 27, 2021

(65) Prior Publication Data
US 2022/0063600 A1 Mar. 3, 2022

(30) Foreign Application Priority Data

Sep. 1, 2020 (JP) ................................ 2020-146746

(51) Int. Cl.
| | |
|---|---|
| *B60W 30/06* | (2006.01) |
| *B60W 10/18* | (2012.01) |
| *B60W 10/20* | (2006.01) |
| *B60W 10/24* | (2006.01) |
| *B60W 30/14* | (2006.01) |
| *B60W 40/076* | (2012.01) |
| *B60W 40/105* | (2012.01) |
| *B60W 50/029* | (2012.01) |

(52) U.S. Cl.
CPC ............ *B60W 30/06* (2013.01); *B60W 10/18* (2013.01); *B60W 10/20* (2013.01); *B60W 10/24* (2013.01); *B60W 30/146* (2013.01); *B60W 40/076* (2013.01); *B60W 40/105* (2013.01); *B60W 50/029* (2013.01); *B60W 2552/15* (2020.02); *B60W 2710/188* (2013.01); *B60W 2710/207* (2013.01)

(58) Field of Classification Search
None
See application file for complete search history.

(56) References Cited

U.S. PATENT DOCUMENTS

| | | | |
|---|---|---|---|
| 5,925,087 A | 7/1999 | Ohnishi et al. | |
| 2018/0022329 A1 | 1/2018 | Sannodo | |
| 2018/0093662 A1* | 4/2018 | Kim | ...................... B60W 30/06 |
| 2019/0232793 A1* | 8/2019 | Atluri | ...................... H02J 7/14 |

(Continued)

FOREIGN PATENT DOCUMENTS

| | | |
|---|---|---|
| JP | 6-74320 A | 3/1994 |
| JP | 2013-205196 A | 10/2013 |
| JP | 2015-3565 A | 1/2015 |

(Continued)

*Primary Examiner* — John F Mortell
(74) *Attorney, Agent, or Firm* — Sughrue Mion, PLLC

(57) ABSTRACT

A vehicle control apparatus sets a target speed of a vehicle such that a maximum value of the target speed is a first speed during a parking assist control. The vehicle control apparatus executes the parking assist control with maintaining a speed of the vehicle at a speed equal to or slower than a predetermined speed limit value slower than the first speed when a predetermined condition that the vehicle moves along a downward slope, is satisfied when a first electric power source device is in a normal state during the parking assist control. At least one of a braking apparatus and a shift change apparatus executes a stopping control of stopping the vehicle when a malfunction occurs in the first electric power source device during the parking assist control.

5 Claims, 11 Drawing Sheets

(56) References Cited

U.S. PATENT DOCUMENTS

2020/0224766 A1* 7/2020 Ganter ................ F16H 63/3433
2021/0009102 A1* 1/2021 Nakayama .............. B60T 8/885

FOREIGN PATENT DOCUMENTS

| JP | 2015-101225 A | 6/2015 |
| JP | 2018-12456 A | 1/2018 |
| JP | 2020-104529 A | 7/2020 |

* cited by examiner

VEHICLE CONTROL APPARATUS

BACKGROUND

Field

The invention relates to a vehicle control apparatus.

Description of the Related Art

There has been proposed a vehicle control apparatus which executes a parking assist control of moving a vehicle to a target area set, depending on a surrounding situation of the vehicle (for example, see JP 2015-101225 A).

The vehicle control apparatus proposed in JP 2015-101225 A (hereinafter, this apparatus will be referred to as "the convention apparatus") is configured to execute the parking assist control even when a driver is out of the vehicle. This control is also called a remote parking assist control. The driver gets out of the vehicle and operates a remote controller or a transmitter. The remote controller transmits a signal to the convention apparatus to cause the convention apparatus to start to execute the parking assist control in response to an operation applied to the remote controller by the driver. When the convention apparatus receives that signal, the convention apparatus determines whether an amount of electric power remaining in an electric power source or a battery provided in the vehicle, is equal to or smaller than a predetermined threshold. When the remaining amount of the electric power is equal to or smaller than the predetermined threshold, the convention apparatus changes a shift position of a transmission to a neutral position. Thereby, if an internal combustion engine does not start due to shortage of the electric power stored in the electric power source, the driver can move the vehicle with applying a force from outside of the vehicle.

Malfunctions or failures may occur in the electric power source while the remote parking assist control is being executed. In this connection, the convention apparatus does not address such malfunctions or failures. For example, when the vehicle is moved along a downward slope by the remote parking assist control, and the malfunction occurs in the electric power source, the driver is outside of the vehicle. Thus, the driver cannot operate a brake pedal of the vehicle. Thus, the vehicle may continue moving.

In order to solve such problems, there is a solution of providing the vehicle with a secondary electric power source in addition to a primary electric power source and stopping the vehicle with the electric power of the secondary electric power source when a failure occurs in the primary electric power source. However, even if such a solution is employed, time taken to stop the vehicle may be increased, or a distance which the vehicle needs to be stopped, may be increased, or the vehicle may move without being stopped.

SUMMARY

Accordingly, an object of the invention is to provide a vehicle control apparatus which can readily stop the vehicle when the malfunction occurs in the electric power source while the vehicle moves along a road having gradient (for example, a downward slope).

A vehicle control apparatus according to the invention, comprises a driving apparatus, a braking apparatus, a shift change apparatus, a steering apparatus, a control unit, a first electric power source device, a second electric power source device, and an electric power supply circuit.

The driving apparatus applies a driving force to at least one driven wheel of wheels of a vehicle. The braking apparatus applies a braking force to the wheels. The shift change apparatus changes a shift position of a transmission of the vehicle to one of positions including a forward moving position, a rearward moving position, and a parking position. The steering apparatus controls a steering angle of at least one steered wheel of the wheels.

The control unit is configured to receive an assistance request generated by a portable device and execute a parking assist control of (i) determining a moving route along which the control unit moves the vehicle from a present position of the vehicle to a predetermined target position in response to receiving the assistance request and (ii) controlling activations of the driving apparatus, the braking apparatus, the shift change apparatus, and the steering apparatus to move the vehicle along the determined moving route.

The first electric power source device is installed in the vehicle. The second electric power source device is also installed in the vehicle.

The electric power supply circuit supplies electric power from the first electric power source device to the driving apparatus, the braking apparatus, the shift change apparatus, the steering apparatus, and the control unit when the first electric power source device is in a normal state while the control unit executes the parking assist control. The electric power supply circuit supplies the electric power from the second electric power source device to at least one of the braking apparatus and the shift change apparatus when a malfunction occurs in the first electric power source device while the control unit executes the parking assist control.

The control unit is configured to set a target speed of the vehicle such that a maximum value of the target speed is a first speed while the control unit executes the parking assist control.

The control unit is configured to execute the parking assist control with maintaining a speed of the vehicle at a speed equal to or slower than a predetermined speed limit value slower than the first speed when the control unit determines that a predetermined condition that the vehicle moves along a downward slope, is satisfied, based on an index value representing a degree of a gradient of a road along which the vehicle moves when the first electric power source device is in the normal state while the control unit executes the parking assist control.

At least one of the braking apparatus and the shift change apparatus is configured to execute a stopping control of stopping the vehicle when the malfunction occurs in the first electric power source device while the control unit executes the parking assist control.

According to the invention, for example, when the malfunction occurs in the first electric power source device while the vehicle moves along the downward slope, the vehicle moves at the predetermined speed limit value or less at a time when the malfunction occurs in the first electric power source device. Thus, the vehicle control apparatus can readily stop the vehicle by the stopping control. Thus, it can be eliminated that the time taken to stop the vehicle is increased, or the distance which the vehicle needs to be stopped, is increased, or the vehicle moves without being stopped.

According to an aspect of the invention, the shift change apparatus may be configured to be able to change the shift position to the parking position when the speed of the vehicle is equal to or slower than a predetermined speed threshold. In this aspect, the predetermined speed limit value may be smaller than the predetermined speed threshold.

Further, in this aspect, the shift change apparatus may be configured to execute a shift control of changing the shift position to the parking position as the stopping control when the malfunction occurs in the first electric power source device while the control unit execute the parking assist control.

According to this aspect of the invention, the predetermined speed limit value is smaller than the predetermined speed threshold at which the shift change apparatus can change the shift position to the parking position. Thus, the shift change apparatus can stop the vehicle by executing the shift control.

According to another aspect of the invention, the first speed may be slower than the predetermined speed threshold.

According to further another aspect of the invention, the control unit may be configured to set the predetermined speed limit value such that the predetermined speed limit value decreases as the degree of the gradient of the downward slope increases when the predetermined condition is satisfied.

The vehicle cannot be readily stopped when the degree of the gradient of the downward slope is large. According to this aspect of the invention, the predetermined speed limit value is set to a smaller value as the degree of the gradient of the downward slope increases. Thus, the vehicle control apparatus can readily stop the vehicle by executing the stopping control.

According to further another aspect of the invention, the braking apparatus may execute a braking force control of applying the braking force to the wheels as the stopping control, and the shift change apparatus may execute a shift control of changing the shift position to the parking position as the stopping control when the malfunction occurs the first electric power source device while the control unit executes the parking assist control. In this aspect, the shift change apparatus may be configured to start to execute the shift control after the braking apparatus starts to execute the braking force control.

According to this aspect of the invention, the braking apparatus starts to execute the braking control of decelerating the vehicle before the shift change apparatus executes the shift control when the malfunction occurs in the first electric power source device. Thus, the shift change apparatus can execute the shift control with the vehicle having been decelerated. Thereby, the vehicle control apparatus can surely stop the vehicle.

According to further another aspect of the invention, the first electric power source device may have a first electric capacity. In this aspect, the second electric power source device may have a second electric capacity smaller than the first electric capacity.

A vehicle control apparatus according to another invention, comprises a driving apparatus, a braking apparatus, a shift change apparatus, a steering apparatus, a control unit, a first electric power source device, a second electric power source device, and an electric power supply circuit.

The driving apparatus applies a driving force to at least one driven wheel of wheels of a vehicle. The braking apparatus applies a braking force to the wheels. The shift change apparatus changes a shift position of a transmission of the vehicle to one of positions including a forward moving position, a rearward moving position, and a parking position. The steering apparatus controls a steering angle of at least one steered wheel of the wheels.

The control unit is configured to execute an autonomous driving control of autonomously controlling activations of the driving apparatus, the braking apparatus, the shift change apparatus, and the steering apparatus.

The first electric power source device is installed in the vehicle. The second electric power source device is also installed in the vehicle.

The electric power supply circuit supplies electric power from the first electric power source device to the driving apparatus, the braking apparatus, the shift change apparatus, the steering apparatus, and the control unit when the first electric power source device is in a normal state while the control unit executes the parking assist control. The electric power supply circuit supplies the electric power from the second electric power source device to at least one of the braking apparatus and the shift change apparatus when a malfunction occurs the first electric power source device while the control unit executes the parking assist control.

The control unit is configured to move the vehicle with controlling a speed of the vehicle to a predetermined target speed while the control unit executes the parking assist control.

The control unit is configured to execute the parking assist control with maintaining the speed of the vehicle at the speed equal to or slower than a predetermined speed limit value slower than the predetermined target speed when the control unit determines that the predetermined condition that the vehicle moves along a downward slope, is satisfied, based on an index value representing a degree of a gradient of a road along which the vehicle moves when the first electric power source device is in the normal state while the control unit executes the parking assist control.

At least one of the braking apparatus and the shift change apparatus is configured to execute a stopping control of stopping the vehicle when the malfunction occurs in the first electric power source device while the control unit executes the parking assist control.

According to further another aspect of the invention, the control unit may be a microprocessor programmed to execute one or more of functions described in this specification. According to further another aspect of the invention, the control unit may be totally or partially realized by hardware, for example, configured by integrated circuits dedicated to one or more applications such as ASICs. In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE EMBODIMENTS

Figure 1:
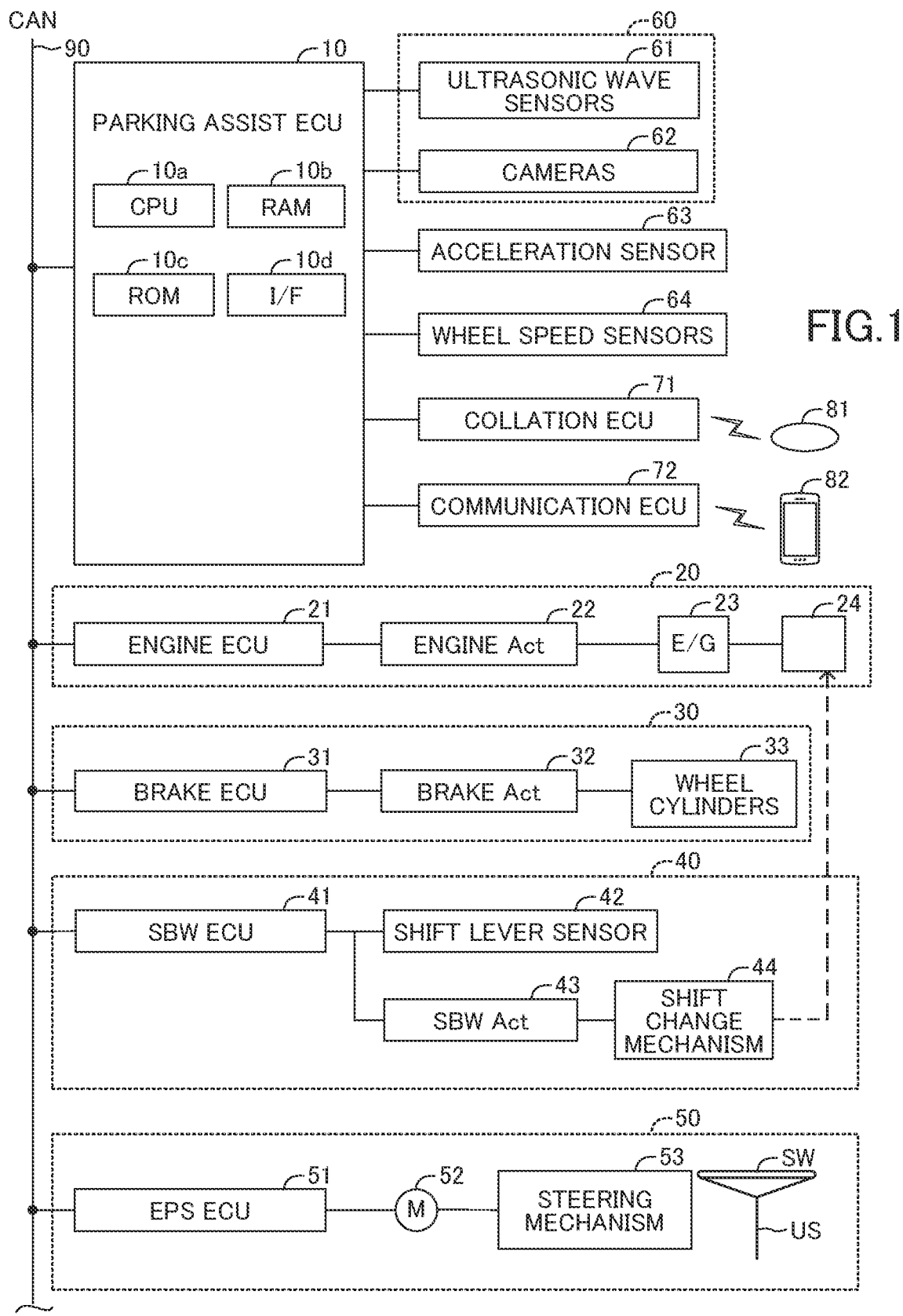
FIG. 1 is a view showing a general configuration of a vehicle control apparatus according to an embodiment of the invention.

A vehicle control apparatus according to an embodiment of the invention is installed in a vehicle. The vehicle installed with the vehicle control apparatus may be referred to as "own vehicle" for the purpose of distinguishing the vehicle installed with the vehicle control apparatus from other vehicles. As shown in FIG. 1, the vehicle comprises a parking assist ECU 10, a driving apparatus 20, a braking apparatus 30, a shift change apparatus 40, and a steering apparatus 50.

In this description, ECU stands for electronic control unit. The ECU includes a micro-computer including a CPU, a RAM, a ROM, and an interface. The CPU realizes various functions by executing instructions stored in the ROM. For example, the parking assist ECU 10 includes a micro-computer including a CPU 10a, a RAM 10b, a ROM 10c, and an interface (I/F) 10d.

The parking assist ECU 10 is electrically connected to send and receive information to and from other ECUs (i.e., various ECUs 21, 31, 41, 51, 71, and 72 described later) via a CAN (Controller Area Network) 90.

The driving apparatus 20 generates driving force and applies the generated driving force to driven wheels of wheels (i.e., a left front wheel, a right front wheel, a left rear wheel, and a right rear wheel). The driving apparatus 20 includes an engine ECU 21, engine actuators 22, an internal combustion engine 23, a transmission 24, and a driving force transmitting mechanism (not shown) which transmits the driving force to the driven wheels. The engine ECU 21 is electrically connected to the engine actuators 22. The engine actuators 22 include a throttle valve actuator for changing an opening degree of a throttle valve of the internal combustion engine 23. The engine ECU 21 can change torque generated by the internal combustion engine 23 by activating the engine actuators 22. The torque generated by the internal combustion engine 23 is transmitted to the driven wheels via the transmission 24 and the driving force transmitting mechanism. Thus, the engine ECU 21 can control the driving force applied to the vehicle by controlling activations of the engine actuators 22. Hereinafter, the torque generated by the internal combustion engine 23 will be referred to as "driving torque".

It should be noted that when the vehicle is a hybrid vehicle, the engine ECU 21 can control the driving force generated by one or both of the internal combustion engine and at least one electric motor as vehicle driving force sources. Further, when the vehicle is an electric vehicle, the engine ECU 21 can control the driving force generated by at least one electric motor as the vehicle driving force source.

The braking apparatus 30 applies braking force to the wheels. The braking apparatus 30 includes a brake ECU 31, brake actuators 32, and wheel cylinders 33. The brake ECU 31 is electrically connected to the brake actuators 32. The brake actuators 32 include known hydraulic circuits, a reservoir (not shown), an oil pump (not shown), and various valve systems (not shown). The brake actuators 32 adjust hydraulic pressure (i.e., braking pressure) applied to the wheel cylinders 33 in response to commands from the brake ECU 31. Friction braking forces generated on the wheels change, depending on the braking pressure. Thus, the brake ECU 31 can control the braking force applied to the vehicle by controlling activations of the brake actuators 32.

The shift change apparatus 40 changes a shift position (a transmission stage) of the transmission 24. In this embodiment, the shift position at least includes a parking position, a neutral position, a forward moving position, and a rearward moving position. When the shift position is set to the parking position, the shift change apparatus 40 stops transmitting the driving torque to the driven wheels and locks the wheels mechanically to prevent the wheels from rotating. In particular, when the shift position is set to the parking position, an output shaft of the transmission 24 is locked to prevent the output shaft from rotating. Such a state is also referred to as "parking locked state" or "P locked state". When the shift position is set to the neutral position, the shift change apparatus 40 does not transmit the driving torque to the driven wheels. However, when the shift position is set to the neutral position, the shift change apparatus 40 does not lock the wheels mechanically. When the shift position is set to the forward moving position, the shift change apparatus 40 transmits the driving torque to the driven wheels as the driving force for moving the vehicle forward. When the shift position is set to the rearward moving position, the shift change apparatus 40 transmits the driving torque to the driven wheels as the driving force for moving the vehicle rearward.

The shift change apparatus 40 includes an SBW (Shift-by-Wire) ECU 41, a shift lever sensor 42, an SBW actuator 43, and a shift change mechanism 44. The SBW ECU 41 is electrically connected to the shift lever sensor 42 and the SBW actuator 43. The shift lever sensor 42 detects a position of the shift lever. The SBW ECU 41 receives the position of the shift lever from the shift lever sensor 42 and controls activations of the SBW actuator 43, based on the received position of the shift lever. The SBW actuator 43 controls activations of the shift change mechanism 44 in response to commands from the SBW ECU 41 and changes the shift position of the transmission 24 to one of shift positions (the parking position, the neutral position, the forward moving position, and the rearward moving position).

In particular, the SBW ECU 41 activates the SBW actuator 43 to control the activation of the shift change mechanism 44 to control the shift position of the transmission 24 to the parking position when the position of the shift lever is "P". When the position of the shift lever is "N", the SBW ECU 41 activates the SBW actuator 43 to control the activation of the shift change mechanism 44 to control the shift position of the transmission 24 to the neutral position. When the position of the shift lever is "D", the SBW ECU 41 activates the SBW actuator 43 to control the activation of the shift change mechanism 44 to control the shift position of the transmission 24 to the forward moving position. When the position of the shift lever is "R", the SBW ECU 41 activates the SBW actuator 43 to control the activation of the shift change mechanism 44 to control the shift position of the transmission 24 to the rearward moving position. It should be noted that the SBW ECU 41 outputs a signal relating to the position of the shift lever received from the shift lever sensor 42 to the parking assist ECU 10.

It should be also noted that the SBW ECU 41 can change the shift position of the transmission 24 to the parking position from the position other than the parking position when a vehicle speed Vs is zero as well as when the vehicle speed Vs is equal to or lower than a predetermined speed threshold Vsth (for example, 3 km/h).

The steering apparatus 50 controls a steered angle of steered wheels (the left front wheel and the right front wheel) of the wheels. The steering apparatus 50 includes an electric power steering ECU (hereinafter, will be referred to as "EPS ECU") 51, an assist motor (M) 52, and a steering mechanism 53. The EPS ECU 51 is electrically connected to the assist motor 52. The assist motor 52 is incorporated in the steering mechanism 53. The steering mechanism 53 is a mechanism which steers the steered wheels in response to an operation of rotating a steering wheel SW. The steering mechanism 53 includes the steering wheel SW, a steering shaft US connected to the steering wheel SW, and a steering gear mechanism (not shown). The EPS ECU 51 detects a steering torque input to the steering wheel SW by a driver with a steering torque sensor (not shown) provided on the steering shaft US and activates the assist motor 52, based on the detected steering torque. The EPS ECU 51 applies a steering torque (a steering assist torque) to the steering mechanism 53 by activating the assist motor 52, thereby assisting a steering operation performed by the driver.

Further, as described later, the parking assist ECU 10 sends steering commands to the assist motor 52 when a parking assist control described later is being executed. When the EPS ECU 51 receives the steering command from the parking assist ECU 10 via the CAN 90, the EPS ECU 51 activates the assist motor 52, based on the steering torque specified by the steering command to change the steered angle of the steered wheels of the vehicle.

The parking assist ECU 10 is electrically connected to surrounding sensors 60. The surrounding sensors 60 acquire vehicle surrounding information. The vehicle surrounding information includes (i) information on objects around the vehicle and (ii) information on lane markings on the road around the vehicle. For example, the objects include moving objects such as automobiles, walking persons, and bicycles, and non-moving objects such as guard rails and fences. The surrounding sensors 60 include ultrasonic wave sensors 61 and cameras 62.

The ultrasonic wave sensor 61 transmits ultrasonic waves in pulse manner to a predetermined range around the vehicle and receives reflected waves reflected by the objects. The ultrasonic wave sensor 61 can detect (i) reflection points on the object at which the transmitted ultrasonic waves are reflected, and (ii) a distance between the ultrasonic wave sensor 61 and the object, based on time from when the ultrasonic wave sensor 61 transmits the ultrasonic wave to when the ultrasonic wave sensor 61 receives the reflected ultrasonic wave.

The camera 62 is a digital camera which incorporates imaging elements such as a CCD (charge coupled device or a CIS (CMOS image sensor). The camera 62 acquires image data on a surrounding situation including (i) positions and shapes of the objects, and (ii) positions and shapes of the lane markings around the vehicle to be checked for pulling the vehicle into or out of a parking space. The camera 62 outputs the acquired image data to the parking assist ECU 10.

The parking assist ECU 10 receives detection signals from the ultrasonic wave sensors 61 each time a predetermined time (hereinafter, for convenience, will be also referred to as "first time") dT1 elapses. The parking assist ECU 10 plots information included in the detection signals (i.e., the positions of the reflection points at which the ultrasonic waves are reflected) on a two dimensional map. The two dimensional map is a plane view which defines a position of the vehicle as an origin, a moving direction of the vehicle on an X axis, and a leftward direction of the vehicle on a Y axis. It should be noted that the position of the vehicle is a position corresponding to a predetermined center portion of the vehicle in a planar view. The parking assist ECU 10 detects the objects around the vehicle, based on the shapes of a group of the reflection points on the two dimensional map. The parking assist ECU 10 specifies a position (distance and orientation) of the detected object with respect to the vehicle. In addition, the parking assist ECU 10 specifies a shape of the detected object.

It should be noted that the position of the vehicle may be the other predetermined position of the vehicle such as (i) a position corresponding to a center portion between the left front wheel and the right front wheel in the planar view, or (ii) a position corresponding to a center portion between the left rear wheel and the right rear wheel in the planar view, or (iii) a position corresponding to a geometric center portion of the vehicle in the planar view.

In addition, the parking assist ECU 10 acquires the image data from the cameras 62 each time the first time dT1 elapses. The parking assist ECU 10 detects the objects around the vehicle by analyzing the image data and specifies the positions (the distances and the orientations) and the shapes of the objects with respect to the vehicle. The parking assist ECU 10 draws the objects specified and detected, based on the image data on the two dimensional map. Thus, the parking assist ECU 10 can detect the objects around the vehicle (in a predetermined distance area from the vehicle), based on the information shown in the two dimensional map.

The parking assist ECU 10 detects an area around the vehicle where no objects exist, based on the information shown in the two dimensional map. When the area where no objects exist, is an area which has a size and a shape enough to park the vehicle or pull the vehicle out thereof, the parking assist ECU 10 determines the area as a parking allowed area or a pulling-out allowed area. It should be noted that when boundary lines which define a parking space around the vehicle, are detected, the parking allowed area has (i) a rectangular shape inside the boundary lines, (ii) long sides longer than a longitudinal length of the vehicle by a first margin, and (iii) short sides longer than a lateral length of the vehicle by a second margin.

In addition, the parking assist ECU 10 is electrically connected to an acceleration sensor 63 and wheel speed sensors 64. The acceleration sensor 63 detects a longitudinal acceleration Gx of the vehicle and outputs a signal representing the detected acceleration Gx to the parking assist ECU 10. The wheel speed sensors 64 are provided at the wheels (the left front wheel, the right front wheel, the left rear wheel, and the right rear wheel), respectively and outputs signals representing rotation angular speeds of the wheels to the parking assist ECU 10. The parking assist ECU 10 calculates the vehicle speed Vs (a moving speed), based on the signals from the wheel speed sensors 64.

The acceleration sensor 63 and the wheel speed sensors 64 detect information on a moving state of the vehicle. Thus, hereinafter, the acceleration sensor 63 and the wheel speed sensors 64 may be collectively referred to as "moving state sensors".

In addition, the parking assist ECU 10 is electrically connected to a collation ECU 71 and a communication ECU 72. The collation ECU 71 is configured to send and receive information to and from a smart key 81 by wireless. The smart key 81 has memorized an identifier used to identify the vehicle. Hereinafter, the identifier will be referred to as "ID". Similarly, the ID used to identify the vehicle has been memorized in a ROM of the collation ECU 71. The collation ECU 71 determines whether the ID sent from the smart key 81 corresponds to the ID memorized in the ROM of the collation ECU 71. When the ID sent from the smart key 81 corresponds to the ID memorized in the ROM of the collation ECU 71, the collation ECU 71 outputs a signal which notifies completion of user authentication to the parking assist ECU 10. Hereinafter, the signal which notifies the completion of the user authentication will be referred to as "authentication completion signal".

The communication ECU 72 is configured to send and receive information to and from a portable device 82 by wireless. The portable device 82 is, for example, a smartphone. An application software dedicated to the parking assist control is installed in the portable device 82. Hereinafter, the application software dedicated to the parking assist control will be referred to as "parking application". The parking assist control is a known control of autonomously moving the vehicle into a target area set, depending on the surrounding situation of the vehicle. As the driver performs a predetermined operation on the parking application, the portable device 82 sends an assistance request signal for requesting an assistance in parking or pulling out to the communication ECU 72 by wireless. When the communication ECU 72 receives the assistance request signal from the portable device 82, the communication ECU 72 outputs the assistance request signal to the parking assist ECU 10. In addition, the portable device 82 receives a displaying command from the parking assist ECU 10 via the communication ECU 72. The portable device 82 displays various information relating to the parking assist control on a display of the portable device 82, based on the received displaying command.

<Contents of Parking Assist Control>

A user (the driver) sends the assistance request signal to the parking assist ECU 10 via the communication ECU 72 by performing the predetermined operation on the parking application. In addition, an assistance mode is set to any one of a parking mode or a pulling-out mode by the parking application. The assistance mode may be set by the user or automatically set, depending on a state of the vehicle and the surrounding situation of the vehicle. Thus, the assistance request signal includes information on the assistance mode.

The parking mode includes a double parking mode and a parallel parking mode. The double parking mode is a mode to perform a parking assistance of double parking the vehicle. The double parking is to park the vehicle perpendicular to a moving direction of a roadway. In particular, the double parking is to park the own vehicle such that (i) one side wall of the own vehicle faces one side wall of another vehicle (first vehicle), (ii) the other side wall of the own vehicle faces one side wall of further another vehicle (second vehicle), and (iii) a longitudinal center line of the own vehicle is parallel to longitudinal center lines of the first and second vehicles.

The parallel parking mode is a mode to perform the parking assistance of parallel parking the own vehicle. The parallel parking is to park the own vehicle such that the own vehicle is parallel to the moving direction of the roadway. In particular, the parallel parking is to park the own vehicle such that (i) a front end of the own vehicle faces a rear or front end of the first vehicle, (ii) a rear end of the own vehicle faces a front or rear end of the second vehicle, and (iii) the longitudinal center line of the own vehicle is on the longitudinal center lines of the first and second vehicles.

The pulling-out mode is a mode to perform the assistance of pulling the parked own vehicle out of the parking space, i.e., moving the parked own vehicle to the roadway.

When the parking mode (the double parking mode or the parallel parking mode) is set as the assistance mode, the parking assist ECU 10 determines a target area to an area where a body of the vehicle occupies if the parking assist ECU 10 parks the vehicle in the parking allowed area. In addition, the parking assist ECU 10 sets a target position Ptgt to a position of the vehicle at which the vehicle is parked in the target area. The target position Ptgt is a position where the center portion of the vehicle in the planar view should reach.

The parking assist ECU 10 calculates a moving route along which the parking assist ECU 10 moves the vehicle to the target position Ptgt from a start position Pst (i.e., the present position) where the parking assist ECU 10 starts to execute the parking assist control. The moving route allows the parking assist ECU 10 to move the vehicle from the start position Pst to the target position Ptgt with maintaining an interval between the body of the vehicle and the objects such as the other vehicles, curbstones, and the guard rails at a predetermined interval or more. It should be noted that the parking assist ECU 10 calculates the moving route by using one of various known calculation methods (for example, a method proposed in JP 2015-3536 A).

When the parking assist ECU 10 determines the moving route, the parking assist ECU 10 determines a moving direction of the vehicle (in particular, the shift position of the transmission 24), a steered angle pattern, and a speed pattern for moving the vehicle along the moving route.

The parking assist ECU 10 sends a shift control command depending on the determined shift position to the SBW ECU 41 via the CAN 90. When the SBW ECU 41 receives the shift control command from the parking assist ECU 10, the SBW ECU 41 executes a shift control of activating the SBW actuator 43 to change the shift position of the transmission 24 to a position specified by the received shift control command.

The steered angle pattern is data which associates the position of the vehicle on the moving route with the steered angle of the steered wheels. The steered angle pattern represents changes of the steering angle while the vehicle is moved along the moving route. The parking assist ECU 10 sends a steering command including a target steered angle depending on the determined steered angle pattern to the EPS ECU 51 via the CAN 90. When the EPS ECU 51 receives the steering command from the parking assist ECU 10, the EPS ECU 51 executes a steered angle control of activating the assist motor 52 to control the actual steered angle to the target steered angle, based on the steering torque specified by the received steering command.

The speed pattern is data which associates the position of the vehicle on the moving route with a target speed Vsa of the vehicle. The speed pattern represents changes of the target speed Vsa while the vehicle is moved along the moving route. According to the speed pattern, the target speed Vsa is gradually increased to a first speed Vs1 after the start position Pst. After the target speed Vsa reaches the first speed Vs1, the target speed Vsa is maintained at the first speed Vs1. Then, the target speed Vsa is gradually decreased as the vehicle approaches the target position Ptgt. When the vehicle reaches the target position Ptgt, the target speed Vsa becomes zero. Thus, the parking assist ECU 10 sets the target speed Vsa such that a maximum value of the target speed Vsa in the speed pattern corresponds to the first speed Vs1. Thus, the vehicle is moved at a speed lower than or equal to the first speed Vs1 while the parking assist control is being executed. In this embodiment, the first speed Vs1 is lower than or equal to the predetermined speed threshold Vsth.

While the vehicle is moved along the moving route, the parking assist ECU 10 sets a final target speed Vtgt by using the speed pattern. The parking assist ECU 10 sends a driving force control command depending on the final target speed Vtgt to the engine ECU 21 via the CAN 90. When the engine ECU 21 receives the driving force control command from the parking assist ECU 10, the engine ECU 21 executes a driving force control of controlling the activations of the engine actuators 22 in response to the received driving force control command. In addition, the parking assist ECU 10 sends a braking force control command depending on the final target speed Vtgt to the brake ECU 31 via the CAN 90. When the brake ECU 31 receives the braking force control command from the parking assist ECU 10, the brake ECU 31 executes a braking force control of controlling the activations of the brake actuators 32 in response to the received braking force control command.

Also, when the pulling-out mode is set as the assistance mode, the parking assist ECU 10 executes the parking assist control in a manner similar to that described above. The parking assist ECU 10 determines an area in the pulling-out allowed area as the target area and sets a position in the target area as the target position Ptgt corresponding to a position of the vehicle which the pulled-out vehicle will finally reach. The parking assist ECU 10 calculates the moving route along which the parking assist ECU 10 moves the vehicle to the target position Ptgt from the start position Pst where the parking assist ECU 10 starts to execute the parking assist control. Then, the parking assist ECU 10 determines the moving direction of the vehicle, the steered angle pattern, and the speed pattern for moving the vehicle along the moving route. Then, the parking assist ECU 10 executes the shift control, the steered angle control, the driving force control, and the braking force control, based on the determined moving direction of the vehicle, the determined steered angle pattern, and the determined speed pattern.

As described above, the parking assist ECU 10 is configured to execute the shift control of changing the shift position of the transmission 24, the steered angle control of changing the steered angle of the steered wheels, the driving force control of controlling the driving force applied to the vehicle, and the braking force control of controlling the braking force applied to the vehicle as the parking assist control when the driver is out of the vehicle.

<Redundant Configuration of Electric Power Source>

Figure 2:
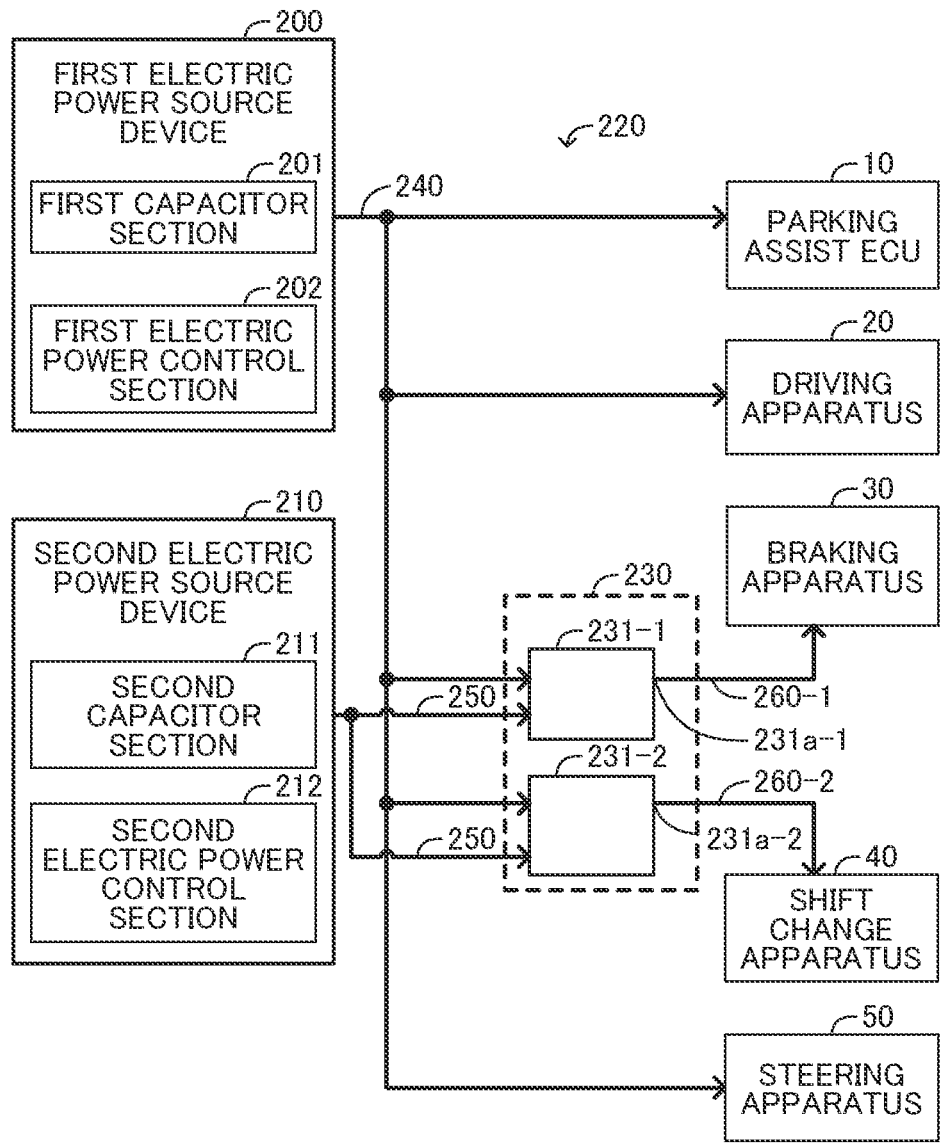
FIG. 2 is a view describing a connection relationship between components of the vehicle control apparatus shown in FIG. 1 and electric power source devices (a first electric power source device and a second electric power source device) installed in a vehicle.

As shown in FIG. 2, the vehicle is provided with a first electric power source device 200, a second electric power source device 210, and an electric power supply circuit 220.

The first electric power source device 200 includes a first capacitor section 201 and a first electric power control section 202. The first capacitor section 201 is a capacitor element which can be charged and discharged. The first capacitor section 201 is, for example, a secondary battery. The secondary battery may be a lithium-ion battery or a nickel hydride battery. The first capacitor section 201 has a first electric power source capacity. The first electric power control section 202 includes (i) a charging/discharging circuit which controls processes of charging and discharging the first capacitor section 201, (ii) an ECU which controls activations of the charging/discharging circuit, and (iii) a known boosting/stepping-down circuit. It should be noted that the ECU of the first electric power control section 202 is activated by electric power of the first capacitor section 201. The first electric power control section 202 is configured to adjust an output voltage of the first capacitor section 201 at a predetermined constant first voltage V1 higher than zero.

The second electric power source device 210 is an electric power source used when a malfunction or a failure occurs in the first electric power source device 200 while the parking assist control is being executed. The second electric power source device 210 includes a second capacitor section 211 and a second electric power control section 212. The second capacitor section 211 is a capacitor element which can be charged and discharged. The second capacitor section 211 includes one or more capacitors. For example, the second capacitor section 211 may be an electric double-layer capacitor. The second capacitor section 211 has a second electric power source capacity. For the purpose of reducing load size and costs for the vehicle, the second electric power capacity of the second capacitor section 211 is smaller than the first electric power capacity of the first capacitor section 201.

With this configuration, the second capacitor section 211 is configured to be charged by the electric power of the first capacitor section 201 when the first electric power source device 200 normally activates. It should be noted that the second capacitor section 211 may be a secondary battery similar to the first capacitor section 201.

The second electric power control section 212 includes (i) a charging/discharging circuit which controls processes of charging and discharging the second capacitor section 211, (ii) an ECU which controls activations of the charging/discharging circuit, and (iii) a known boosting/stepping-down circuit. It should be noted that the ECU of the second electric power control section 212 is activated by the electric power of the second capacitor section 211. The second electric power control section 212 is configured to adjust an output voltage of the second capacitor section 211 to a predetermined constant second voltage V2 higher than zero. The predetermined constant second voltage V2 is lower than the predetermined constant first voltage V1.

In addition, the ECU of the second electric power control section 212 can detect a malfunction of the second capacitor section 211. When the ECU of the second electric power control section 212 starts to execute the parking assist control, the ECU of the second electric power control section 212 determines whether a malfunction occurs in the second capacitor section 211. For example, when the voltage of the capacitor of the second capacitor section 211 is equal to or lower than a predetermined voltage, the electric power of the second capacitor section 211 is short, and the ECU of the second electric power control section 212 determines that a malfunction occurs in the second capacitor section 211. When the malfunction occurs in the second capacitor section 211, the ECU of the second electric power control section 212 notifies the parking assist ECU 10 via the CAN 90 that the malfunction occurs in the second capacitor section 211.

The electric power supply circuit 220 includes an electric power source redundant circuit 230, a first electric power source line 240, and a second electric power source line 250. The first electric power source line 240 extends from the first electric power source device 200 and is electrically connected to the parking assist ECU 10, the driving apparatus 20, the steering apparatus 50, and the electric power source redundant circuit 230. The second electric power source line 250 extends from the second electric power source device 210 and is electrically connected to the electric power source redundant circuit 230.

Figure 3:
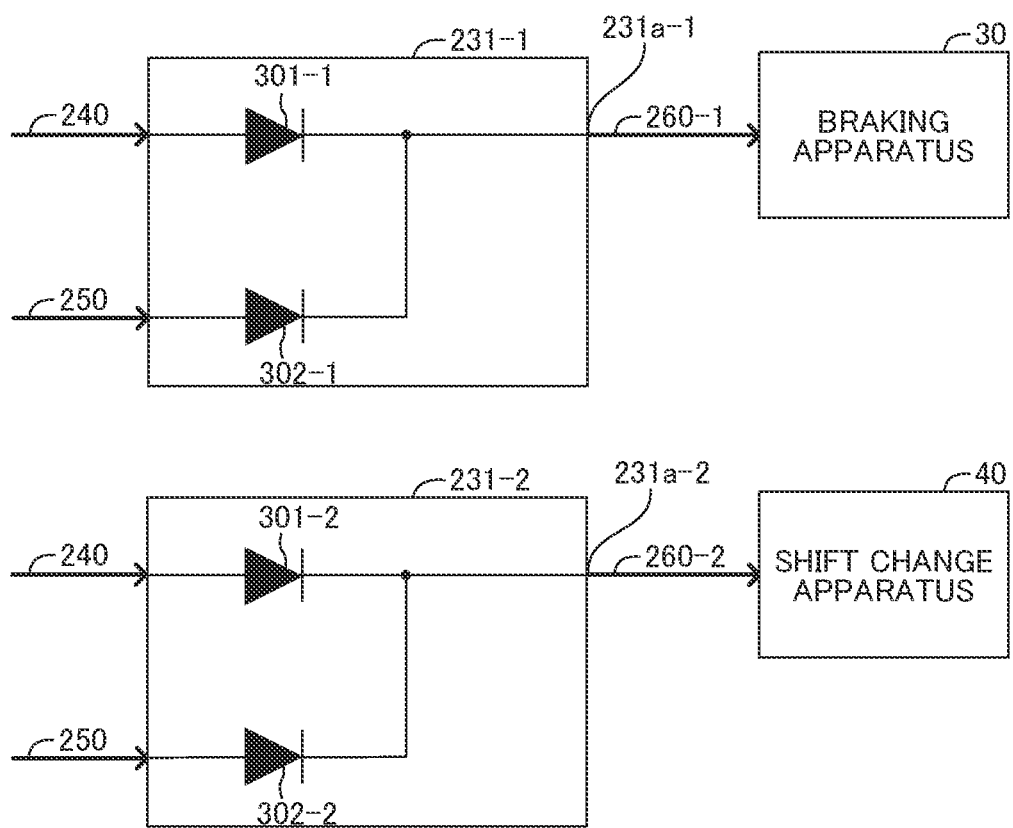
FIG. 3 is a view showing a configuration of a selection circuit shown in FIG. 2.

As shown in FIG. 2, the electric power source redundant circuit 230 includes a first selection circuit 231-1 and a second selection circuit 231-2. The first selection circuit 231-1 and the second selection circuit 231-2 are configured to selectively output the electric power supplied from the first capacitor section 201 via the first electric power source line 240 or the electric power supplied from the second capacitor section 211 via the second electric power source line 250, respectively. As shown in FIG. 3, the first selection circuit 231-1 and the second selection circuit 231-2 are diode OR circuits.

The first selection circuit 231-1 includes (i) a first diode 301-1 which has an anode electrically connected to the first electric power source line 240 and (ii) a second diode 302-1 which has an anode electrically connected to the second electric power source line 250. A cathode of the first diode 301-1 and a cathode of the second diode 302-1 are electrically connected to an output end 231a-1 of the first selection circuit 231-1. The output end 231a-1 of the first selection circuit 231-1 is electrically connected to an output line 260-1. The output line 260-1 is electrically connected to the braking apparatus 30.

The second selection circuit 231-2 includes (i) a first diode 301-2 which has an anode electrically connected to the first electric power source line 240 and (ii) a second diode 302-2 which has an anode electrically connected to the second electric power source line 250. A cathode of the first diode 301-2 and a cathode of the second diode 302-2 are electrically connected to an output end 231a-2 of the second selection circuit 231-2. The output end 231a-2 of the second selection circuit 231-2 is electrically connected to an output line 260-2. The output line 260-2 is electrically connected to the shift change apparatus 40.

Configurations of the first selection circuit 231-1 and the second selection circuit 231-2 are the same. Thus, operations of the first selection circuit 231-1 will be described below. The first selection circuit 231-1 selects the electric power having a higher voltage from (i) the electric power of the anode of the first diode 301-1 and (ii) the electric power of the anode of the second diode 302-1. In particular, in the first selection circuit 231-1, when the voltage applied to the first diode 301-1 via the first electric power source line 240 is higher than the voltage applied to the second diode 302-1 via the second electric power source line 250, a line from the first diode 301-1 to the output end 231a-1 is live. In this case, the first selection circuit 231-1 outputs the electric power of the first capacitor section 201 from the output end 231a-1 to the output line 260-1. The electric power of the first capacitor section 201 is supplied to the braking apparatus 30 via the output line 260-1.

On the other hand, when the voltage applied to the second diode 302-1 via the second electric power source line 250 is higher than the voltage applied to the first diode 301-1 via the first electric power source line 240, a line from the second diode 302-1 to the output end 231a-1 is live. In this case, the first selection circuit 231-1 outputs the electric power of the second capacitor section 211 from the output end 231a-1 to the output line 260-1. The electric power of the second capacitor section 211 is supplied to the braking apparatus 30 via the output line 260-1.

Summary of Operations

When a state of an ignition switch (not shown) is changed from an OFF state to an ON state, the first electric power control section 202 applies the predetermined constant first voltage V1 to the first electric power source line 240. The electric power of the first capacitor section 201 is supplied to the parking assist ECU 10, the driving apparatus 20, and the steering apparatus 50 via the first electric power source line 240. In addition, the electric power of the first capacitor section 201 is supplied to the electric power source redundant circuit 230 via the first electric power source line 240. The electric power of the first capacitor section 201 is supplied to the braking apparatus 30 and the shift change apparatus 40 via the electric power source redundant circuit 230. Thus, the parking assist ECU 10, the driving apparatus 20, the braking apparatus 30, the shift change apparatus 40, and the steering apparatus 50 are activated by the electric power of the first capacitor section 201. It should be noted that when the parking assist control is not executed, the electric power of the second capacitor section 211 is not supplied to the electric power source redundant circuit 230.

Next, operations of the vehicle control apparatus (1) when the first electric power source device 200 normally activates and (2) when a malfunction occurs in the first electric power source device 200, will be described.

(1) Case that the First Electric Power Source Device 200 Normally Activates.

The parking assist ECU 10 sends a starting command to the second electric power control section 212 when (i) the parking assist ECU 10 receives the assistant request signal, and (ii) an execution condition described later is satisfied. The second electric power control section 212 applies the predetermined constant second voltage V2 to the second electric power source line 250 in response to the starting command. Then, the parking assist ECU 10 determines the moving direction of the vehicle, the steered pattern of the vehicle, and the speed pattern of the vehicle as described above and starts to execute the parking assist control in accordance with the determined moving direction, the determined steered pattern, and the determined speed pattern. When the parking assist control is being executed, and the first electric power source device 200 normally activates, the parking assist ECU 10, the driving apparatus 20, and the steering apparatus 50 are activated by the electric power supplied thereto via the first electric power source line 240 (i.e., the electric power of the first capacitor section 201). In addition, the voltage of the first electric power source line 240 (i.e. the predetermined constant first voltage V1) is higher than the voltage of the second electric power source line 250 (i.e. the predetermined constant second voltage V2). Thus, the first selection circuit 231-1 outputs the electric power of the first capacitor section 201 supplied via the first electric power source line 240 to the output line 260-1, and the second selection circuit 231-2 outputs the electric power of the first capacitor section 201 supplied via the first electric power source line 240 to the output line 260-2. Thus, the braking apparatus 30 and the shift change apparatus 40 are activated by the electric power of the first capacitor section 201.

(2) Case that the Malfunction Occurs in the First Electric Power Source Device 200.

When the malfunction occurs in the first electric power source device 200 while the parking assist control is being executed, the electric power of the first capacitor section 201 is not supplied to the first electric power source line 240. Thereby, the voltage of the first electric power source line 240 lowers (for example, to zero). The parking assist ECU 10, the driving apparatus 20, and the steering apparatus 50 stop their activations. In this case, the voltage of the second electric power source line 250 (i.e., the predetermined constant second voltage V2) becomes higher than the voltage of the first electric power source line 240 (i.e., zero). Thus, the first selection circuit 231-1 outputs the electric power of the second capacitor section 211 to the output line 260-1, and the second selection circuit 231-2 outputs the electric power of the second capacitor section 211 to the output line 260-2. Thus, even when the malfunction occurs in the first electric power source device 200, the electric power of the second capacitor section 211 is supplied to the braking apparatus 30 via the first selection circuit 231-1 and to the shift change apparatus 40 via the second selection circuit 231-2. Thus, the braking apparatus 30 and the shift change apparatus 40 are activated by the electric power of the second capacitor section 211.

The parking assist ECU 10 communicates with the engine ECU 21, the brake ECU 31, the SBW ECU 41, and the EPS ECU 51 via the CAN 90 each time a predetermined time Tm elapses while the parking assist ECU 10 executes the parking assist control. In particular, the parking assist ECU 10 sends the command signals including the control commands described above to the engine ECU 21, the brake ECU 31, the SBW ECU 41, and the EPS ECU 51 and receives reply signals from the engine ECU 21, the brake ECU 31, the SBW ECU 41, and the EPS ECU 51. When the malfunction occurs in the first electric power source device 200, the electric power of the first capacitor section 201 is not supplied to the parking assist ECU 10, the parking assist ECU 10 stops its activation. Thereby, sending the command signals is stopped. Even in this case, as described above, the braking apparatus 30 and the shift change apparatus 40 are activated by the electric power of the second capacitor section 211.

When the malfunction occurs in the first electric power source device 200, the vehicle control apparatus executes a stopping control of stopping the vehicle. The stopping control includes (i) a braking force control executed by the brake ECU 31 (hereinafter, will be referred to as "first control") and (ii) a shift control executed by the shift change apparatus 40 (hereinafter, will be referred to as "second control".

In particular, the brake ECU 31 determines that the malfunction occurs in the first electric power source device 200 when the brake ECU 31 has not received the command signal from the parking assist ECU 10 for a predetermined time threshold Tth while the parking assist control is being executed. It should be noted that the predetermined time threshold Tth is longer than the predetermined time Tm. When the brake ECU 31 determines that the malfunction occurs in the first electric power source device 200, the brake ECU 31 executes the first control. The first control is a control of stopping the vehicle by applying the braking force to the wheels before the vehicle reaches the target position Ptgt.

Similarly, the SBW ECU 41 determines that the malfunction occurs in the first electric power source device 200 when the SBW ECU 41 has not received the command signal from the parking assist ECU 10 for the predetermined time threshold Tth while the parking assist control is being executed. When the SBW ECU 41 determines that the malfunction occurs in the first electric power source device 200, the SBW ECU 41 executes the second control. The second control is a control of changing the shift position of the transmission 24 to the parking position. The state of the transmission 24 is changed to a parking lock state by the second control. Thus, the vehicle can be stopped.

It should be noted that the SBW ECU 41 starts to execute the second control at the time when a predetermined time Ta elapses since the SBW ECU 41 determines that the malfunction occurs in the first electric power source device 200. In other words, the SBW ECU 41 starts to execute the second control after the SBW ECU 41 stays for the predetermined time Ta. As the SBW ECU 41 stays, the brake ECU 31 starts to execute the first control. Thus, the vehicle speed Vs is lowered. Thus, the SBW ECU 41 has an increased chance to execute the second control (i.e., change the shift position to the parking position) with the vehicle speed Vs equal to or lower than the predetermined speed threshold Vsth.

As described above, even when the malfunction occurs in the first electric power source device 200 while the parking assist control is being executed, the braking apparatus 30 and the shift change apparatus 40 are activated by the electric power of the second capacitor section 211. The braking apparatus 30 executes the first control, and the shift change apparatus 40 executes the second control. Thus, even when the malfunction occurs in the first electric power source device 200 while the parking assist control is being executed with the driver being out of the vehicle, the vehicle can be stopped.

While the parking assist ECU 10 executes the parking assist control, the vehicle may move along a downward slope. If the malfunction occurs in the first electric power source device 200 while the vehicle moves along the downward slope, the time taken to stop the vehicle may be increased, or the distance which the vehicle needs to be stopped, may be increased, or the vehicle may move without being stopped.

For addressing this problem, the parking assist ECU 10 calculates an index value which represents a degree of a gradient of a road along which the vehicle move when the first electric power source device 200 is in a normal state while the parking assist ECU 10 executes the parking assist control. In this embodiment, the index value is a gradient angle θ which is an angle defined between a road surface ahead of the vehicle and a horizontal plane. The parking assist ECU 10 calculates the gradient angle θ by using signals from the moving state sensors (the acceleration sensor 63 and the wheel speed sensors 64) with known techniques (for example, see JP 6-74320 A). In this embodiment, the gradient angle θ takes a positive value when the vehicle moves along an upward slope and takes a negative value when the vehicle moves along the downward slope.

Then, the parking assist ECU 10 determines whether a predetermined speed limit condition is satisfied. The predetermined speed limit condition is a condition which is satisfied when the vehicle moves along the downward slope, in particular, when the gradient angle θ is equal to or smaller than a predetermined negative gradient angle threshold θth. When the parking assist ECU 10 determines that the predetermined speed limit condition is satisfied, the parking assist ECU 10 limits the vehicle speed Vs to control the vehicle speed Vs to a predetermined speed limit value Vs_lim or less. It should be noted that the predetermined speed limit value Vs_lim is lower than the first speed Vs1. Thus, the predetermined speed limit value Vs_lim, the first speed Vs1, and the predetermined speed threshold Vsth have a relationship shown by an expression 1 described below.

$$Vs\_lim < Vs1 < Vsth \qquad (1)$$

Thus, even when the malfunction occurs in the first electric power source device 200 while the vehicle moves along the downward slope, the vehicle moves at a relatively low speed. Thus, the vehicle control apparatus can readily stop the vehicle by executing the stopping control. Thus, it can be eliminated that the time taken to stop the vehicle is increased, or the distance which the vehicle needs to be stopped, is increased, or the vehicle moves without being stopped.

In addition, even when the braking apparatus 30 executes the first control, the vehicle may not be stopped due to the large gradient of the downward slope. In this case, the vehicle speed Vs gradually increases due to the gradient of the downward slope. In such a situation, the vehicle control apparatus can stop the vehicle. The vehicle moves at a speed (Vs_lim) lower than the predetermined speed threshold Vsth when the malfunction occurs in the first electric power source device 200. Thus, the vehicle speed Vs does not readily become higher than the predetermined speed threshold Vsth when the shift change apparatus 40 starts to execute the second control. Thus, the shift change apparatus 40 can change the shift position of the transmission 24 to the parking position by executing the second control.

In this embodiment, as shown in the expression 1, the first speed Vs1 is also lower than the predetermined speed threshold Vsth. Thereby, the vehicle moves at a speed considerably lower than the predetermined speed threshold Vsth at a point in time when the malfunction occurs in the first electric power source device 200 occurs. Thus, the shift change apparatus 40 can surely stop the vehicle by executing the second control.

Figure 4:
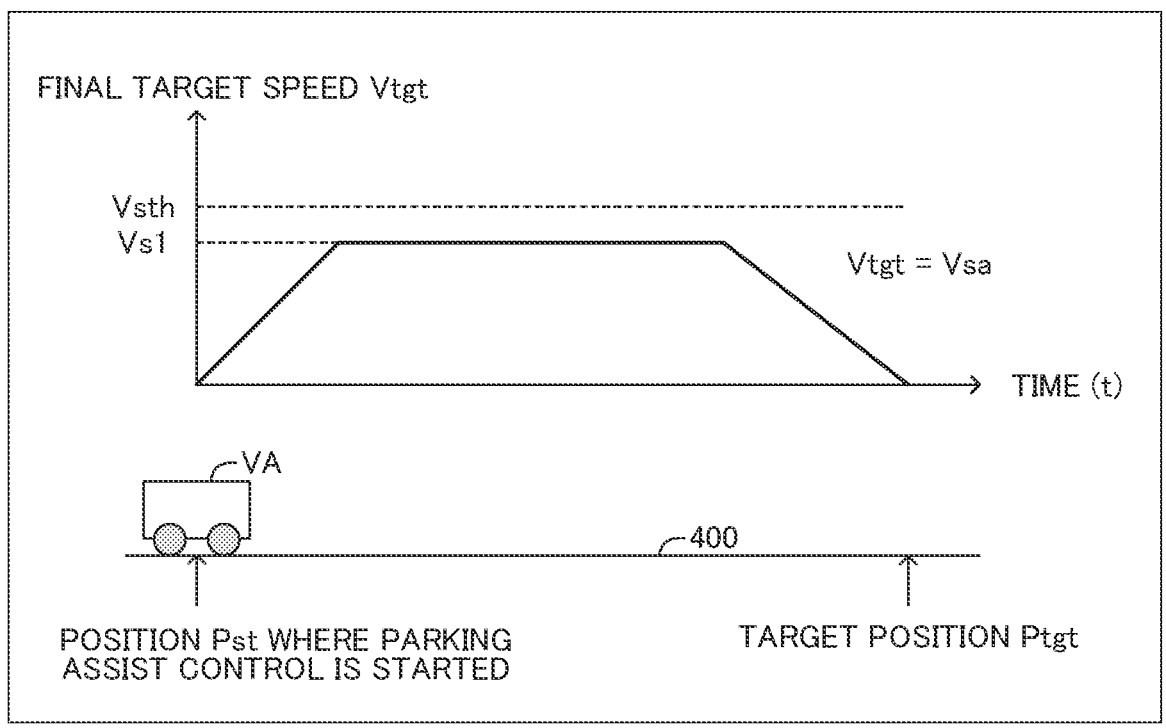
FIG. 4 is a view showing an example of a change of a final target speed Vtgt with time while the vehicle moves to a target position Ptgt from a start position Pst where a parking assist control is started to be executed.

The controls described above will be described with reference to FIG. 4 and FIG. 5. In an example shown in FIG. 4, the vehicle VA moves along a level road 400 while the parking assist control is being executed. An upper view of FIG. 4 shows a change of the final target speed Vtgt with time while the vehicle VA moves to the target position Ptgt from the start position Pst where the parking assist control is started to be executed. When the vehicle VA moves along the level road 400, the parking assist ECU 10 sets the target speed Vsa of the speed pattern as the final target speed Vtgt. Thus, the change of the final target speed Vtgt with time shown in FIG. 4 corresponds to a change of the target speed Vsa defined by the speed pattern.

Figure 5:
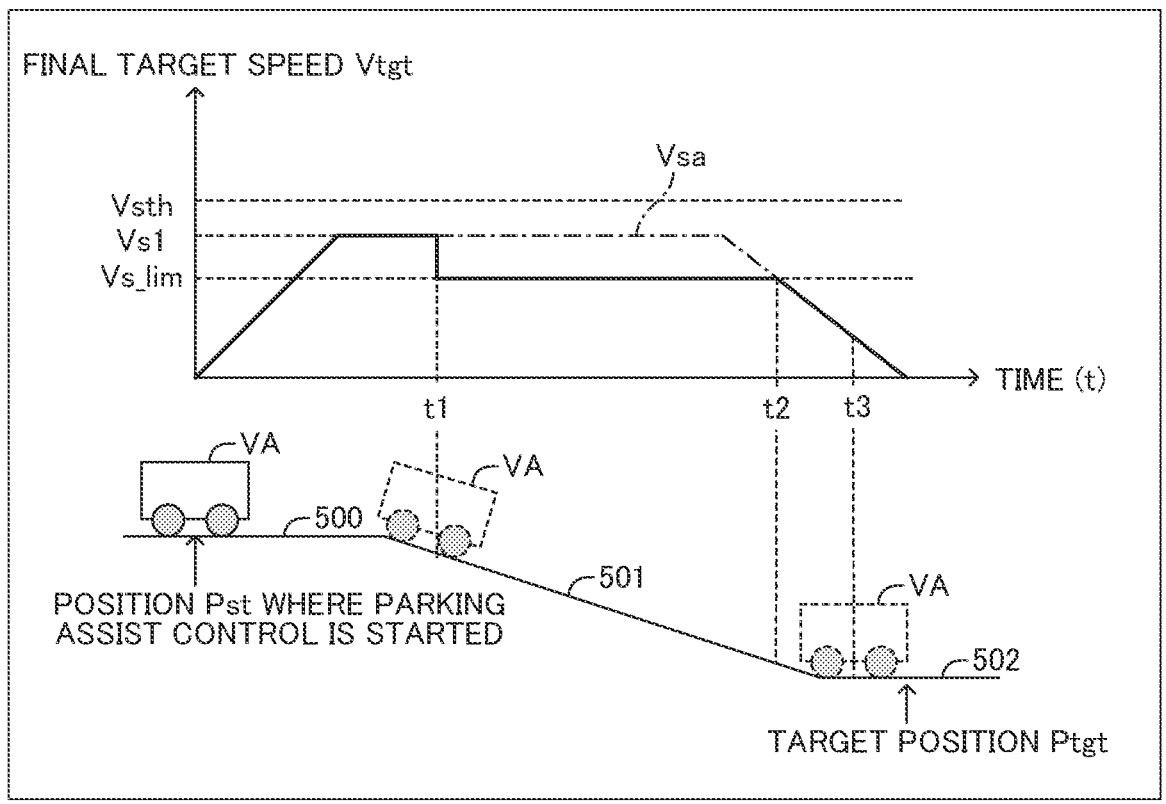
FIG. 5 is a view showing another example of the change of the final target speed Vtgt with time while the vehicle moves to the target position Ptgt from the start position Pst where the parking assist control is started to be executed.

In an example shown in FIG. 5, the vehicle VA moves along a road 500 including a downward slope 501. An upper view of FIG. 5 shows the change of the final target speed Vtgt with time while the vehicle VA moves to the target position Ptgt from the start position Pst where the parking assist control is started to be executed. At a time t1, the vehicle VA starts to move along the downward slope 501. The gradient angle θ is equal to or smaller than the predetermined negative gradient angle threshold θth. Thus, the parking assist ECU 10 determines that a predetermined speed limitation condition is satisfied. In this case, the parking assist ECU 10 compares the target speed Vsa with the predetermined speed limit value Vs_lim. The parking assist ECU 10 sets the final target speed Vtgt to smaller one of the target speed Vsa defined by the speed pattern and the predetermined speed limit value Vs_lim. At the time t1, the predetermined speed limit value Vs_lim is lower than the target speed Vsa (=Vs1) defined by the speed pattern. Thus, the parking assist ECU 10 sets the final target speed Vtgt to the predetermined speed limit value Vs_lim. Thus, the parking assist ECU 10 limits the final target speed Vtgt such that the vehicle speed Vs is controlled to the predetermined speed limit value Vs_lim.

At a time t2, the vehicle VA still moves along the downward slope 501. Thus, the predetermined speed limit condition is satisfied. Thus, the parking assist ECU 10 compares the target speed Vsa defined by the speed pattern with the predetermined speed limit value Vs_lim. At the time, the target speed Vsa defined by the speed pattern is lower than the predetermined speed limit value Vs_lim. Thus, the parking assist ECU 10 sets the final target speed Vtgt to the target speed Vsa defined by the speed pattern.

At a time t3, the vehicle VA starts to move along a level road 502. At the time, the parking assist ECU 10 determines that the predetermined speed limit condition is not satisfied. Thus, the parking assist ECU 10 sets the final target speed Vtgt to the target speed Vsa defined by the speed pattern.

If the malfunction occurs in the first electric power source device 200 while the vehicle VA moves along the downward slope 501, the vehicle speed Vs corresponds to the predetermined speed limit value Vs_lim. The predetermined speed limit value Vs_lim is lower than the first speed Vs1. Thus, the braking apparatus 30 can stop the vehicle VA for a short time by executing the first control.

Even if the vehicle VA is not stopped due to the gradient of the downward slope 501 although the first control is executed, and the vehicle speed Vs gradually increases, the predetermined speed limit value Vs_lim is set to a value lower than the predetermined speed threshold Vsth. Thus, the vehicle speed Vs cannot be higher than the predetermined speed threshold Vsth when the shift change apparatus 40 starts to execute the second control even if the vehicle speed Vs gradually increases. Thus, the shift change apparatus 40 can change the shift position of the transmission 24 to the parking position by executing the second control. Thereby, the vehicle can be surely stopped.

<Operations>

Next, operations of the CPU of the parking assist ECU 10 (hereinafter, will be referred to as "CPU 1") will be described. The CPU 1 is configured or programmed to execute a double parking assist execution routine shown by a flowchart in FIG. 6 each time a second time dT2 equal to or longer than the first time dT1 elapses.

It should be noted that the CPU 1 executes an initial routine (not shown) to set values of flags described below to "0" when the state of the ignition switch is changed from the OFF state to the ON state. In addition, as described above, when the malfunction occurs in the first electric power source device 200, a supply of the electric power to the parking assist ECU 10 is stopped, and as a result, the activation of the parking assist ECU 10 is stopped. In this case, the CPU 1 executes the initial routine to set the values of the flags to "0" when the supply of the electric power to the parking assist ECU 10 is restarted.

In addition, when the state of the ignition switch is changed from the OFF state to the ON state, the first electric power control section 202 of the first electric power source device 200 applies the predetermined constant first voltage V1 to the first electric power source line 240.

In addition, the CPU 1 is configured or programmed to execute a routine not shown to acquire the vehicle surrounding information from the surrounding sensors 60 each time the first time dT1 elapses. In addition, the CPU 1 is configured or programmed to execute a routine not shown to update the two dimensional map described above, based on the acquired vehicle surrounding information.

Figure 6:
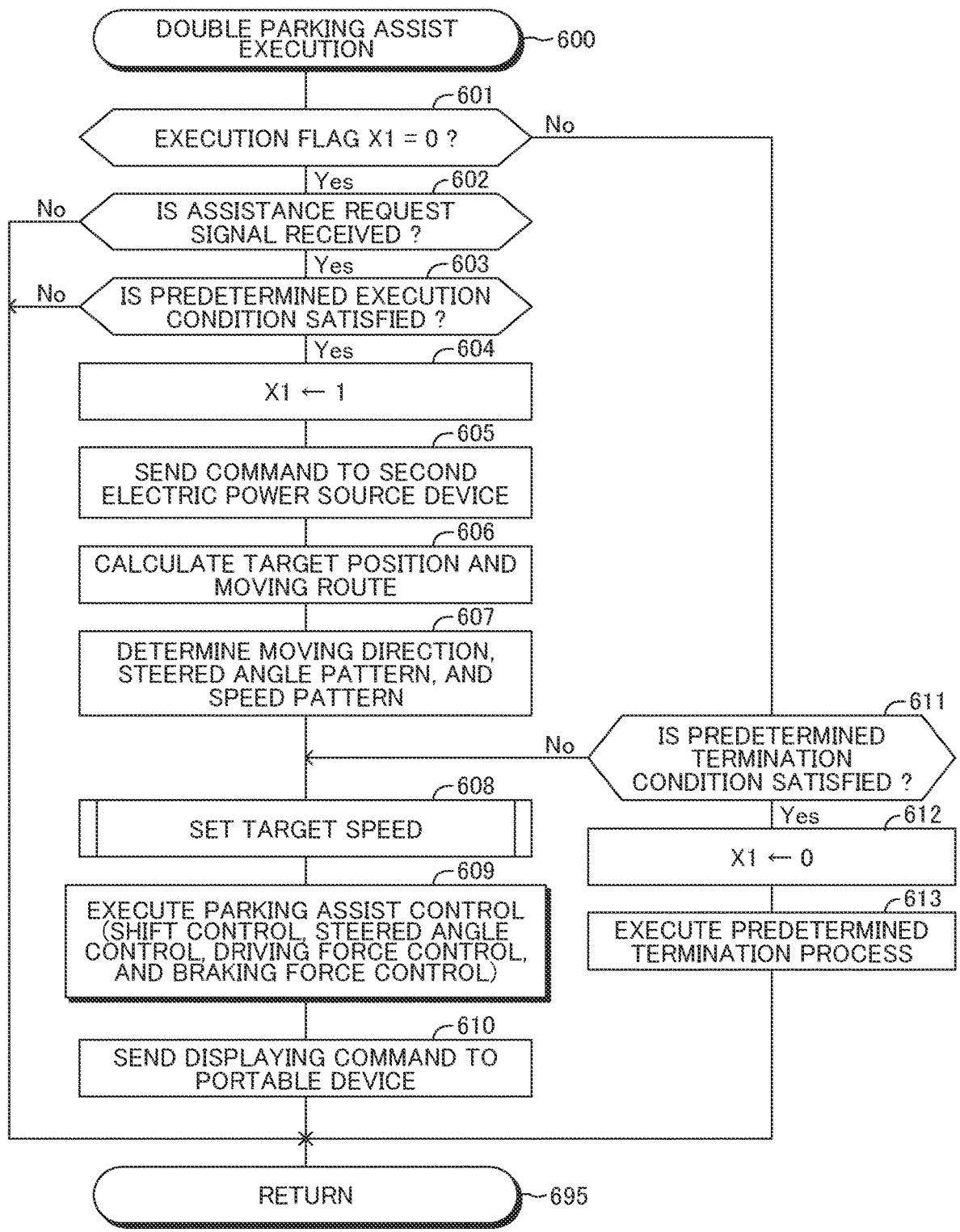
FIG. 6 is a view showing a flowchart of a double parking assist execution routine executed by a CPU of a parking assist ECU.

At a predetermined timing, the CPU 1 starts a process from a step 600 in FIG. 6 and proceeds with the process to a step 601 to determine whether a value of a parking assist execution flag X1 is "0". When the value of the parking assist execution flag X1 is "0", the parking assist execution flag X1 represents that the parking assist control is not executed. On the other hand, when the value of the parking assist execution flag X1 is "1", the parking assist execution flag X1 represents that the parking assist control is being executed.

When the value of the parking assist execution flag X1 is "0", the CPU 1 determines "Yes" at the step 601 and proceeds with the process to a step 602 to determine whether the CPU 1 receives the assistance request signal including information on the assistance mode from the portable device 82. When the CPU 1 does not receive the assistant request signal, the CPU 1 determines "No" at the step 602 and proceeds with the process directly to a step 695 to terminate executing this routine once.

When the CPU 1 receives the assistant request signal, the CPU 1 determines "Yes" at the step 602 and proceeds with the process to a step 603 to determine whether a predetermined execution condition is satisfied. The predetermined execution condition is satisfied when conditions A1 to A5 described below are all satisfied.

Condition A1: The CPU 1 receives the identification completion signal from the collation ECU 71.

Condition A2: The assistance mode which the assistance request signal represents, is the double parking mode.

Condition A3: The position of the shift lever is the parking position (P).

Condition A4: The CPU 1 has detected the parking allowed area having a size and a shape which allow the CPU 1 to double park the vehicle.

Condition A5: The CPU 1 does not receive a notification from the ECU of the second electric power control section 212, notifying that the malfunction has occurred in the second capacitor section 211. In other words, the voltage of the capacitor of the second capacitor section 211 is not equal to or lower than the predetermined voltage.

When the predetermined execution condition is not satisfied, the CPU 1 determines "No" at the step 603 and proceeds with the process directly to the step 695 to terminate executing this routine once. In this case, the CPU 1 may send a displaying command to the portable device 82. When the portable device 82 receives the displaying command, the portable device 82 displays on the parking application that the parking assist control for double parking cannot be executed.

On the other hand, when the predetermined execution condition is satisfied, the CPU 1 determines "Yes" at the step 603 and execute processes of steps 604 to 610 described below. Then, the CPU 1 proceeds with the process to the step 695 to terminate executing this routine once.

Step 604: The CPU 1 sets the value of the parking assist execution flag X1 to "1".

Step 605: The CPU 1 sends the starting command to the ECU of the second electric power control section 212 of the second electric power source device 210. When the ECU of the second electric power control section 212 receives the starting command, the ECU of the second electric power control section 212 applies the predetermined constant second voltage V2 to the second electric power source line 250.

Step 606: The CPU 1 determines the target area to an area which the body of the vehicle predictively occupies if the vehicle is parked in the detected parking allowed area. The CPU 1 sets the target position Ptgt in the target area. In addition, the CPU 1 calculates the moving route along which the CPU 1 moves the vehicle from the start position Pst (i.e., the present position) to the target position Ptgt.

Step 607: The CPU 1 determines the moving direction of the vehicle (in particular, the shift position of the transmission 24), the steered pattern of the vehicle, and the speed pattern of the vehicle used for moving the vehicle along the moving route.

Step 608: The CPU 1 executes a target speed setting routine shown in FIG. 7 described later. The CPU 1 sets the final target speed Vtgt by executing the target speed setting routine shown in FIG. 7.

Step 609: The CPU 1 executes the parking assist control. In particular, the CPU 1 executes the shift control by sending the shift control command to the SBW ECU 41 in accordance with the determined shift position. The CPU 1 executes the steered angle control by sending the steering command (the target steered angle) to the EPS ECU 51 in accordance with the steered angle pattern. The CPU 1 executes the driving force control by sending the driving force control command to the engine ECU 21 in accordance with the final target speed Vtgt. In addition, the CPU 1 executes the braking force control by sending the braking force control command to the brake ECU 31 in accordance with the final target speed Vtgt.

Step 610: The CPU 1 sends the displaying command to the portable device 82. When the portable device 82 receives the displaying command, the portable device 82 displays on the parking application that the parking assist control is being executed. Then, the CPU 1 proceeds with the process directly to the step 695 to terminate executing this routine once.

When the CPU 1 starts to executes the routine in FIG. 6 again and proceeds with the process to the step 601 after the CPU 1 starts to execute the parking assist control, the CPU 1 determines "No" at the step 601 and proceeds with the process to a step 611. The CPU 1 determines whether a predetermined termination condition is satisfied. The predetermined termination condition is satisfied when the vehicle reaches the target position Ptgt.

When the predetermined termination condition is not satisfied, the CPU 1 determines "No" at the step 611 and executes processes of steps 608 to 610 described below. Then, the CPU 1 proceeds with the process to the step 695 to terminate executing this routine once.

On the other hand, when the predetermined termination condition is satisfied, the CPU 1 determines "Yes" at the step 611 and executes processes of steps 612 and 613 described below. Then, the CPU 1 proceeds with the process to the step 695 to terminate executing this routine once.

Step 612: The CPU 1 sets the value of the parking assist execution flag X1 to "0".

Step 613: The CPU 1 executes a predetermined termination process. In particular, the CPU 1 stops the vehicle at the target position Ptgt by the braking force control. Then, the CPU 1 sends the shift control command to the SBW ECU 41 to change the shift position of the transmission 24 to the parking position with maintaining the vehicle being stopped at the target position Ptgt. In addition, the CPU 1 sends the displaying command to the portable device 82. When the portable device 82 receives the displaying command, the portable device 82 displays on the parking application that an execution of the parking assist control is terminated. Then, the CPU 1 changes the state of the ignition switch from the ON state to the OFF state.

Figure 7:
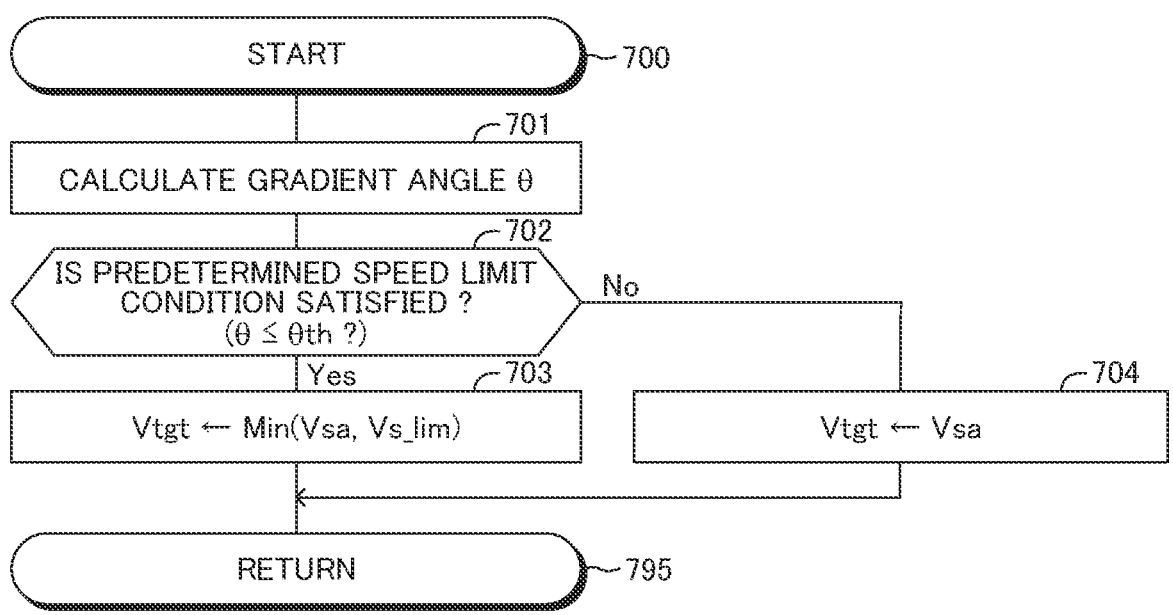
FIG. 7 is a view showing a flowchart of a target speed setting routine executed at a step 608 of the double parking assist execution routine shown in FIG. 6 by the CPU of the parking assist ECU.

When the CPU 1 proceeds with the process to the step 608 of the routine shown in FIG. 6, the CPU 1 starts a process from a step 700 of a routine shown in FIG. 7 and proceeds with the process to a step 701 to calculate the gradient angle θ by using the signals sent from the moving state sensors. Then, the CPU 1 proceeds with the process to a step 702 to determine whether the predetermined speed limit condition is satisfied. As described above, the CPU 1 determines that the predetermined speed limit condition is satisfied when the gradient angle θ is equal to or smaller than the predetermined negative gradient angle threshold θth.

When the predetermined speed limit condition is satisfied, the CPU 1 determines "Yes" at the step 702 and proceeds with the process to a step 703. When the CPU 1 proceeds with the process to the step 703, the CPU 1 sets the final target speed Vtgt to smaller one of the target speed Vsa defined by the speed pattern and the predetermined speed limit value Vs_lim. It should be noted that a Min function in the step 703 is a function of selecting smaller one of the target speed Vsa and the predetermined speed limit value Vs_lim. Then, the CPU 1 proceeds with the process to a step 795 and proceeds with the process from the step 608 in FIG. 6 to a step 609.

On the other hand, when the predetermined speed limit condition is not satisfied, the CPU 1 determines "No" at the step 702 and proceeds with the process to a step 704 to set the final target speed Vtgt to the target speed Vsa defined by the speed pattern. Then, the CPU 1 proceeds with the process to the step 795 and proceeds with the process from the step 608 to the step 609 in FIG. 6.

Figure 8:
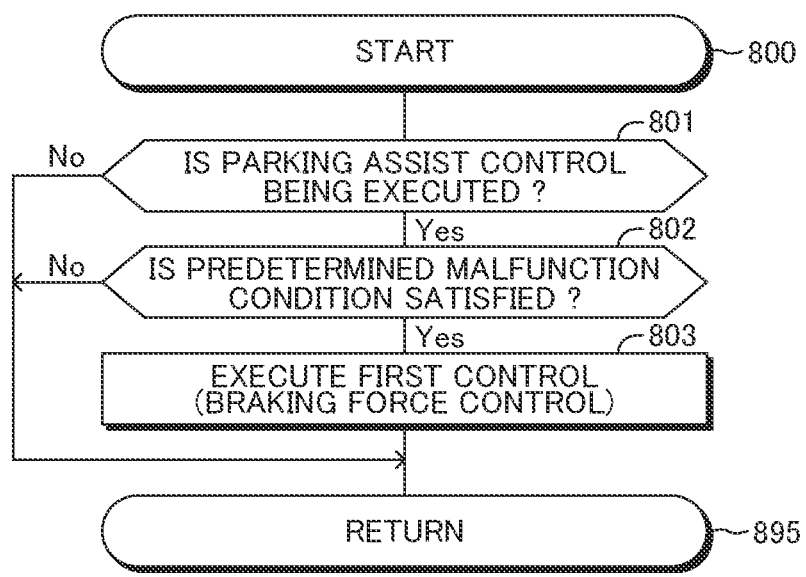
FIG. 8 is a view showing a flowchart of a first control execution routine executed by a CPU of a brake ECU.

Further, the CPU of the brake ECU 31 (hereinafter, will be referred to as "CPU 2") is configured or programmed to execute a first control execution routine shown by a flowchart in FIG. 8 each time the second time dT2 elapses.

Thus, at a predetermined timing, the CPU 2 starts a process from a step 800 and proceeds with the process to a step 801 to determine whether the parking assist control is being executed. When the parking assist control is not executed at the time, the CPU 2 determines "No" at the step 801 and proceeds with the process directly to a step 895 to terminate executing this routine once.

On the other hand, when the parking assist control is being executed, the CPU 2 determines "Yes" at the step 801 and proceeds with the process to a step 802 to determine whether a predetermined malfunction condition is satisfied. The predetermined malfunction condition is satisfied when the CPU 2 has not received the command signal from the parking assist ECU 10 for the predetermined time threshold Tth or more. When the predetermined malfunction condition is not satisfied, the CPU 2 determines "No" at the step 802 and proceeds with the process directly to the step 895 to terminate executing this routine once.

When the malfunction occurs in the first capacitor section 201 of the first electric power source device 200, and the voltage of the first electric power source line 240 becomes zero, the activation of the parking assist ECU 10 is stopped. Thus, the predetermined constant second voltage V2 of the second electric power source line 250 becomes higher than the voltage of the first electric power source line 240. Thus, the first selection circuit 231-1 outputs the electric power of the second capacitor section 211 to the braking apparatus 30 via the output line 260-1. Thereby, even when the malfunction occurs in the first electric power source device 200, the CPU 2 can activate.

Thus, the predetermined malfunction condition is satisfied, and the CPU 2 determines "Yes" at the step 802 and proceeds with the process to a step 803 to execute the first control. In particular, the CPU 2 applies the braking force to the wheels by controlling the activations of the brake actuators 32. Then, the CPU 2 proceeds with the process to the step 895 to terminate executing this routine once.

Figure 9:
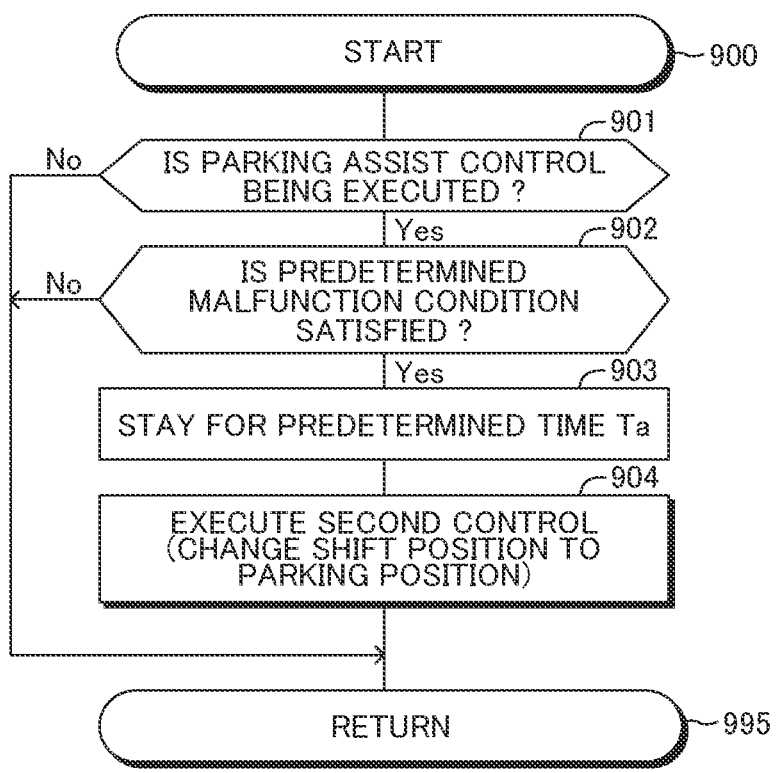
FIG. 9 is a view showing a flowchart of a second control execution routine executed by a CPU of an SBW ECU.

Furthermore, the CPU of the SBW ECU 41 (hereinafter, will be referred to as "CPU 3") is configured or programmed to execute a second control execution routine shown by a flowchart in FIG. 9 each time the second time dT2 elapses.

Thus, at a predetermined timing, the CPU 3 starts a process from a step 900 and proceeds with the process to a step 901 to determine whether the parking assist control is being executed. When the parking assist control is not executed at the time, the CPU 3 determines "No" at the step 901 and proceeds with the process directly to a step 995 to terminate executing this routine once.

On the other hand, when the parking assist control is being executed, the CPU 3 determines "Yes" at the step 901 and proceeds with the process to a step 902 to determine whether the predetermined malfunction condition is satisfied as described above. When the predetermined malfunction condition is not satisfied, the CPU 3 determines "No" at the step 902 and proceeds with the process directly to the step 995 to terminate executing this routine once.

When the malfunction occurs in the first capacitor section 201 of the first electric power source device 200, the first selection circuit 231-1 outputs the electric power of the second capacitor section 211 to the shift change apparatus 40 via the output line 260-2 as described above. Thereby, even when the malfunction occurs in the first electric power source device 200, the CPU 3 can activate.

When the predetermined malfunction condition is satisfied, the CPU 3 determines "Yes" at the step 902 and executes processes of steps 903 and 904 described below. Then, the CPU 3 proceeds with the process to the step 995 to terminate executing this routine once.

Step 903: The CPU 3 stays for the predetermined time Ta. As described above, the CPU 2 starts to execute the first control while the CPU 3 stays for the predetermined time Ta.

Step 904: The CPU 3 executes the second control. In particular, the CPU 3 changes the shift position to the parking position by controlling the activation of the SBW actuator 43.

According to the configuration described above, the vehicle control apparatus determines whether the predetermined speed limit condition is satisfied while the vehicle control apparatus executes the parking assist control. In particular, the predetermined speed limit condition is a condition which is satisfied when the vehicle moves along the downward slope. In particular, the predetermined speed limit condition is satisfied when the gradient angle θ is equal to or smaller than the predetermined negative gradient angle threshold θth. When the parking assist ECU 10 determines that the predetermined speed limit condition is satisfied, the parking assist ECU 10 limits the vehicle speed Vs to the predetermined speed limit value Vs_lim. If the malfunction occurs in the first electric power source device 200 while the vehicle moves along the downward slope, the vehicle moves at a relatively low speed (=Vs_lim) at a point in time when the malfunction occurs in the first electric power source device 200. Thus, the vehicle control apparatus can readily stop the vehicle by executing the stopping control. Thus, it can be eliminated that the time taken to stop the vehicle is increased, or the distance which the vehicle needs to be stopped, is increased, or the vehicle moves without being stopped.

Further, the predetermined speed limit value Vs_lim is lower than the predetermined speed threshold Vsth. Thus, the vehicle speed Vs is equal to or lower than the predetermined speed threshold Vsth at a point in time when the shift change apparatus 40 starts to execute the second control. Thus, the shift change apparatus 40 can stop the vehicle VA by executing the second control.

Further, the brake ECU 31 starts to execute the first control at a point in time when the brake ECU 31 determines that the malfunction occurs in the first electric power source device 200, and the SBW ECU 41 starts to execute the second control at a point in time when the predetermined time Ta elapses since the malfunction occurs in the first electric power source device 200. Thus, the shift position is changed to the parking position with the vehicle having been decelerated. In other words, the shift change apparatus 40 can execute the second control with the vehicle speed Vs equal to or lower than the predetermined speed threshold Vsth.

For example, when the malfunction occurs in the first electric power source device 200 while the vehicle moves along the heavy downward slope, the braking apparatus 30 needs to continuously apply the relatively great braking force to the wheels in order to decelerate the vehicle. Thus, the electric power should be continuously supplied to the braking apparatus 30 from the second electric power source device 210. In this connection, the electric power source capacity of the second electric power source device 210 is smaller than the electric power source capacity of the first electric power source device 200. Therefore, the electric power necessary to decelerate the vehicle may not be continuously supplied to the braking apparatus 30 from the second electric power source device 210. If the electric power necessary to decelerate the vehicle is not continuously supplied to the braking apparatus 30 from the second electric power source device 210, the vehicle speed Vs gradually increases due to the gradient of the downward slope. On the other hand, according to the configuration of the embodiment, even when the vehicle speed Vs gradually increases, the vehicle speed Vs does not readily become higher than the predetermined speed threshold Vsth at a point in time when the shift change apparatus 40 starts to execute the second control. Thus, even when the electric power source capacity of the second electric power source device 210 is relatively small, the vehicle control apparatus can stop the vehicle by the second control. Thus, the small electric power source capacity of the second electric power source device 210 can be accepted. Thus, the configuration of realizing the redundant electric power source can be achieved with low costs.

It should be noted that the invention is not limited to the aforementioned embodiments, and various modifications can be employed within the scope of the invention.

Modified Example 1

Figure 10:
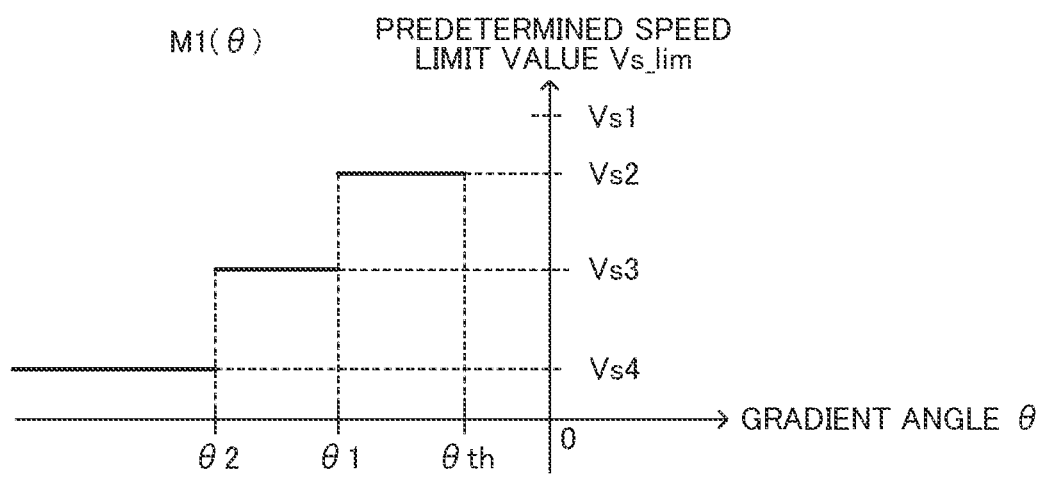
FIG. 10 is a view showing a first map M1 which defines a relationship between a gradient angle θ of a road and a speed limit value Vs_lim.

Processes described below may be added to between the step 702 and the step 703 of the routine shown in FIG. 7. The CPU 1 may be configured to set the predetermined speed limit value Vs_lim such that the predetermined speed limit value Vs_lim decreases as the degree of the gradient of the downward slope increases. The CPU 1 may set the predetermined speed limit value Vs_lim by applying the gradient angle θ to a first map M1(θ) shown in FIG. 10 (Vs_lim←M1(θ)). The first map M1 defines a relationship between the gradient angle θ and the predetermined speed limit value Vs_lim. In the first map M1, when the gradient angle θ is equal to or smaller than the predetermined negative gradient angle threshold θth and is greater than a first gradient angle θ1, the predetermined speed limit value Vs_lim is a second speed Vs2. When the gradient angle θ is equal to or smaller than the first gradient angle θ1, and is greater than a second gradient angle θ2, the predetermined speed limit value Vs_lim is a third speed Vs3. When the gradient angle θ is equal to or smaller than the second gradient angle θ2, the predetermined speed limit value Vs_lim is a fourth speed Vs4. In this connection, the speeds Vs1, Vs2, Vs3, and Vs4 have a relationship of "Vs4<Vs3<Vs2<Vs1". As described above, the CPU 1 may be configured to decease the predetermined speed limit value Vs_lim in a stepwise manner, depending on the degree of the gradient of the downward slope.

As the degree of the gradient of the downward slope increases, the vehicle becomes unlikely to be stopped. According to this configuration, as the degree of the gradient of the downward slope increases, the vehicle speed Vs decreases while the parking assist control is being executed. Thus, the vehicle control apparatus can readily stop the vehicle by executing the stopping control. In addition, the shift change apparatus 40 has an increased chance to execute the second control with the vehicle speed Vs equal to or lower than the predetermined speed threshold Vsth.

Figure 11:
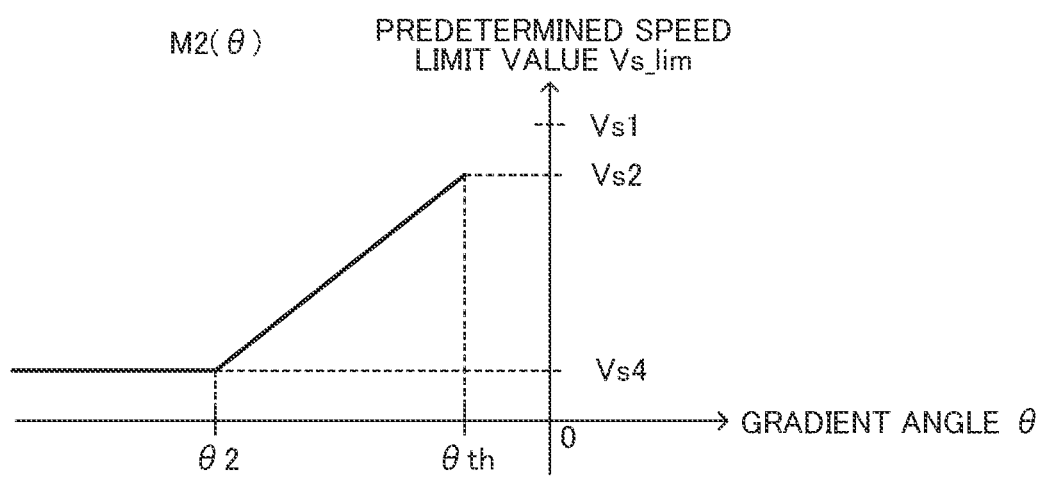
FIG. 11 is a view showing a second map M2 which defines the relationship between the gradient angle θ of the road and the speed limit value Vs_lim.

In another modified example, the CPU 1 may be configured to set the predetermined speed limit value Vs_lim by applying the gradient angle θ to a second map M2(θ) shown in FIG. 11 (Vs_lim←M2(θ)). The second map M2 defines a relationship between the gradient angle θ and the predetermined speed limit value Vs_lim. In the second map M2, when the gradient angle θ is equal to the predetermined negative gradient angle threshold θth, the predetermined speed limit value Vs_lim is the second speed Vs2 lower than the first speed Vs1. In the second map M2, as the gradient angle θ decreases (i.e., the degree of the gradient of the downward slope increases), the predetermined speed limit value Vs_lim gradually decreases. When the gradient angle θ is equal to or smaller than a second gradient angle θ2, the predetermined speed limit value Vs_lim is the fourth speed Vs4. As described above, the CPU 1 may be configured to gradually decrease the predetermined speed limit value Vs_lim, depending on the degree of the gradient of the downward slope.

Modified Example 2

The first selection circuit 231-1 may be omitted from the electric power source redundant circuit 230. According to this configuration, the first electric power source line 240 is directly electrically connected to the braking apparatus 30. When the malfunction occurs in the first electric power source device 200, the braking apparatus 30 does not activate. The electric power of the second capacitor section 211 is supplied only to the shift change apparatus 40 via the second selection circuit 231-2. Thus, only the shift change apparatus 40 activates by using the electric power of the second capacitor section 211. The shift change apparatus 40 executes the second control without staying for the predetermined time Ta when the predetermined malfunction condition is satisfied. Thereby, the vehicle is stopped.

According to this modified example, when the malfunction occurs in the first electric power source device 200 while the vehicle moves along the downward slope, the shift change apparatus 40 can execute the second control with the vehicle speed Vs equal to or lower than the predetermined speed threshold Vsth.

Modified Example 3

The second selection circuit 231-2 may be omitted from the electric power source redundant circuit 230. According to this configuration, the first electric power source line 240 is directly electrically connected to the shift change apparatus 40. When the malfunction occurs in the first electric power source device 200, the shift change apparatus 40 does not activate. The electric power of the second capacitor section 211 is supplied only to the braking apparatus 30 via the first selection circuit 231-1. Thus, only the braking apparatus 30 activates by using the electric power of the second capacitor section 211. The braking apparatus 30 executes the first control when the predetermined malfunction condition is satisfied. Thereby, the vehicle is stopped.

Modified Example 4

The speed pattern for the parking assist control is not limited to the speed patterns of the examples described above. The first speed Vs1 defined by the speed pattern may be higher than the predetermined speed threshold Vsth. In this configuration, the predetermined speed limit value Vs_lim is lower than the predetermined speed threshold Vsth. Also, according to this configuration, the shift change apparatus 40 can execute the second control with the vehicle speed Vs equal to or lower than the predetermined speed threshold Vsth when the malfunction occurs in the first electric power source device 200 while the vehicle moves along the downward slope.

In another modified example, the first speed Vs1 defined by the speed pattern is higher than the predetermined speed threshold Vsth. Further, the predetermined speed limit value Vs_lim may be lower than the first speed Vs1 and equal to or higher than the predetermined speed threshold Vsth. Therefore, the predetermined speed threshold Vsth, the predetermined speed limit value Vs_lim, and the first speed Vs1 may have a relationship of "Vsth≤Vs_lim<Vs1". In this case, the predetermined time Ta is set to a time longer than a time taken to decrease the vehicle speed Vs to a speed lower than the predetermined speed threshold Vsth by the first control (i.e., the braking force control). According to this configuration, the shift change apparatus 40 can execute the second control with the vehicle speed Vs equal to or lower than the predetermined speed threshold Vsth.

Modified Example 5

The index value which represents the degree of the gradient of the road, is not limited to the index value described above. For example, the index value may be a gradient value Sv. The gradient value Sv is a ratio of a horizontal length of a distance which the vehicle has moved for a certain time and a vertical length of the distance which the vehicle has moved for the certain time. The gradient value Sv is expressed with percent. The gradient value Sv (%) takes a positive value when the vehicle moves along the upward slope and a negative value when the vehicle moves along the downward slope. The parking assist ECU 10 may calculate the gradient value Sv in accordance with known techniques. For example, the parking assist ECU 10 may acquire the gradient value Sv by applying a difference between a base acceleration and the actual longitudinal acceleration Gx to a predetermined map. For example, the base acceleration is an acceleration corresponding to an operation amount of an acceleration pedal or a so-called accelerator opening degree while the vehicle moves along the plane road. The map defines the difference between the base acceleration and the actual longitudinal acceleration Gx such that an absolute value of the gradient value Sv increases as an absolute value of the difference between the base acceleration and the actual longitudinal acceleration Gx, increases. With this configuration, the CPU 1 determines at the step 702 of the routine shown in FIG. 7 that the predetermined speed limit condition is satisfied when the gradient value Sv is equal to or smaller than a predetermined negative gradient threshold Svth.

It should be noted that known tiltmeters or gradient angle sensors may be used to acquire the index value described above. Further, the parking assist ECU 10 may be configured to determine whether the vehicle moves along the downward slope by using cameras or laser radiation devices directed to the road (for example, see JP 2013-205196 A).

Modified Example 6

The brake ECU 31 and the SBW ECU 41 may be configured to determine whether the malfunction occurs in the first electric power source device 200 with communicating the first electric power source device 200. According to this configuration, for example, the brake ECU 31 sends a predetermined signal to the first electric power control section 202 of the first electric power source device 200 each time a predetermined time elapses and receives a reply signal in response to the sent signal. When the brake ECU 31 has not received the reply signal from the first electric power control section 202 for the predetermined time threshold Tth or more while the parking assist control is being executed, the brake ECU 31 may determine that the malfunction occurs in the first electric power source device 200. With the similar technique, the SBW ECU 41 may communicate the first electric power control section 202 and determine whether the malfunction occurs in the first electric power source device 200.

Modified Example 7

In the parallel parking mode and the pulling-out mode, controls similar to the parking assist control described above are executed except that the target area where the vehicle is moved, is different. Thus, the routines shown in FIGS. 6 to 9 can be used for the parallel parking mode and the pulling-out mode.

When the parking assist control in the parallel parking mode is executed, the predetermined execution condition of the step 603 of the routine shown in FIG. 6, is replaced with a condition which is satisfied when conditions B1 to B5 described below are all satisfied.

Condition B1: The CPU 1 receives the identification completion signal from the collation ECU 71.
Condition B2: The assist mode represented by the assistance request signal is the parallel parking mode.
Condition B3: The position of the shift lever is the parking position (P).
Condition B4: The CPU 1 detects the parking allowed area having a size and a shape which allow the vehicle to be parallel parked.
Condition B5: The CPU 1 does not receive a notification from the ECU of the second electric power control section 212, notifying that the malfunction occurs in the second capacitor section 211.

When the parking assist control in the pulling-out mode is executed, the predetermined execution condition of the step 603 of the routine shown in FIG. 6, is replaced with a condition which is satisfied when conditions C1 to C5 described below are all satisfied.

Condition C1: The CPU 1 receives the identification completion signal from the collation ECU 71.
Condition C2: The assist mode represented by the assistance request signal is the pulling-out mode.
Condition C3: The position of the shift lever is the parking position (P).
Condition C4: The CPU 1 detects the pulling-out allowed area having a size and a shape which allow the vehicle to be pulled out.
Condition C5: The CPU 1 does not receive a notification from the ECU of the second electric power control section 212, notifying that the malfunction occurs in the second capacitor section 211.

Modified Example 8

Circuits other than the diode OR circuits may be used as the first selection circuit 231-1 and the second selection circuit 231-2. For example, the electric power source redundant circuit 230 may include a so-called relay circuit. The relay circuit includes a switch which changes a first state that the first electric power source line 240 is electrically connected to the output line 260-1 or the output line 260-2 to a second state that the second electric power source line 250 is electrically connected to the output line 260-1 or the output line 260-2. According to this configuration, the electric power source redundant circuit 230 further includes an ECU which detects the malfunction of the first electric power source device 200. The ECU changes a state of the switch from the first state to the second state in response to detecting the malfunction of the first electric power source device 200. This ECU which detects the malfunction of the first electric power source device 200 may monitor whether the voltage of the second electric power source line 250 is higher than the voltage of the first electric power source line 240. Then, this ECU may determine that the malfunction occurs in the first electric power source device 200 when the voltage of the second electric power source line 250 is higher than the voltage of the first electric power source line 240.

Further, circuits using MOS-FET may be used as the first selection circuit 231-1 and the second selection circuit 231-2. With this configuration, the selection circuit 231 can selectively output any of the electric power of the first capacitor section 201 supplied via the first electric power source line 240 and the electric power of the second capacitor section 211 supplied via the second electric power source line 250.

Modified Example 9

The configurations described above can be used for a valet parking. The valet parking is a control of autonomously moving the vehicle in the parking lot to autonomously park the vehicle in a vacant space. A control apparatus which executes the valet parking is provided at the parking lot, not the vehicle. The control apparatus monitors a situation of the parking lot (for example, the number of the parked vehicles, the number of the vacant spaces, and positions of the vacant spaces). The control apparatus sends a command signal for executing the valet parking for the vehicle after the driver gets out of the vehicle. Thereby, the vehicle can be autonomously moved in the parking lot and autonomously parked in the vacant space.

Modified Example 10

The configurations described above may be used for autonomous driving controls. The autonomous driving control is a control of autonomously controlling the moving speed of the vehicle and the steered angle of the steered wheels without driving operations performed by the driver of the vehicle. For this configuration, the vehicle is provided with an autonomous driving ECU for the autonomous driving control. For example, the autonomous driving ECU moves the vehicle by the autonomous driving control such that the vehicle speed Vs is controlled to a predetermined target speed Vset. The target speed Vset may be set by the driver. The target speed Vset may be set, depending on the surrounding situation of the vehicle (for example, an inter-vehicle distance between the vehicle and a preceding vehicle and an inter-vehicle time taken for the vehicle to reach the preceding vehicle). When the malfunction occurs in the first electric power source device 200 while the autonomous driving control is executed, the autonomous driving ECU determines whether the predetermined speed limit condition is satisfied. When the autonomous driving ECU determines that the predetermined speed limit condition is satisfied, the autonomous driving ECU limits the vehicle speed Vs to the predetermined speed limit value Vs_lim or less. The predetermined speed limit value Vs_lim is lower than the target speed Vset. When the malfunction occurs in the first electric power source device 200 while the autonomous driving control is executed, at least one of the braking apparatus 30 and the shift change apparatus 40 executes the stopping control of stopping the vehicle.

What is claimed is:
1. A vehicle control apparatus, comprising:
a driving apparatus which applies a driving force to at least one driven wheel of wheels of a vehicle;
a braking apparatus which applies a braking force to the wheels;
a shift change apparatus which changes a shift position of a transmission of the vehicle to one of positions including a forward moving position, a rearward moving position, and a parking position;
a steering apparatus which controls a steering angle of at least one steered wheel of the wheels;
a control unit which is configured to receive an assistance request generated by a portable device and execute a parking assist control of (i) determining a moving route along which the control unit moves the vehicle from a present position of the vehicle to a predetermined target position in response to receiving the assistance request and (ii) controlling activations of the driving apparatus, the braking apparatus, the shift change apparatus, and the steering apparatus to move the vehicle along the determined moving route;

a first electric power source device installed in the vehicle;

a second electric power source device installed in the vehicle; and an electric power supply circuit which supplies electric power from the first electric power source device to the driving apparatus, the braking apparatus, the shift change apparatus, the steering apparatus, and the control unit when the first electric power source device is in a normal state while the control unit executes the parking assist control, and supplies the electric power from the second electric power source device to at least one of the braking apparatus and the shift change apparatus when a malfunction occurs in the first electric power source device while the control unit executes the parking assist control, wherein the control unit is configured to set a target speed of the vehicle such that a maximum value of the target speed is a first speed while the control unit executes the parking assist control, wherein the control unit is configured to execute the parking assist control with maintaining a speed of the vehicle at a speed equal to or slower than a predetermined speed limit value slower than the first speed when the control unit determines that a predetermined condition that the vehicle moves along a downward slope, is satisfied, based on an index value representing a degree of a gradient of a road along which the vehicle moves when the first electric power source device is in the normal state while the control unit executes the parking assist control, wherein at least one of the braking apparatus and the shift change apparatus is configured to execute a stopping control of stopping the vehicle when the malfunction occurs in the first electric power source device while the control unit executes the parking assist control, wherein the braking apparatus executes a braking force control of applying the braking force to the wheels as the stopping control, and the shift change apparatus executes a shift control of changing the shift position to the parking position as the stopping control when the malfunction occurs in the first electric power source device while the control unit executes the parking assist control, and wherein the shift change apparatus is configured to start to execute the shift control after the braking apparatus starts to execute the braking force control.

2. The vehicle control apparatus as set forth in claim 1, wherein:

the first electric power source device has a first electric capacity; and the second electric power source device has a second electric capacity smaller than the first electric capacity.

3. A vehicle control apparatus, comprising:

a driving apparatus which applies a driving force to at least one driven wheel of wheels of a vehicle;

a braking apparatus which applies a braking force to the wheels;

a shift change apparatus which changes a shift position of a transmission of the vehicle to one of positions including a forward moving position, a rearward moving position, and a parking position;

a steering apparatus which controls a steering angle of at least one steered wheel of the wheels;

a control unit which is configured to execute an autonomous driving control of autonomously controlling activations of the driving apparatus, the braking apparatus, the shift change apparatus, and the steering apparatus;

a first electric power source device installed in the vehicle;

a second electric power source device installed in the vehicle; and an electric power supply circuit which supplies electric power from the first electric power source device to the driving apparatus, the braking apparatus, the shift change apparatus, the steering apparatus, and the control unit when the first electric power source device is in a normal state while the control unit executes the parking assist control, and supplies the electric power from the second electric power source device to at least one of the braking apparatus and the shift change apparatus when a malfunction occurs in the first electric power source device while the control unit executes the parking assist control, wherein the control unit is configured to move the vehicle with controlling a speed of the vehicle to a predetermined target speed while the control unit executes the parking assist control;

wherein the control unit is configured to execute the parking assist control with maintaining the speed of the vehicle at the speed equal to or slower than a predetermined speed limit value slower than the predetermined target speed when the control unit determines that the predetermined condition that the vehicle moves along a downward slope, is satisfied, based on an index value representing a degree of a gradient of a road along which the vehicle moves when the first electric power source device is in the normal state while the control unit executes the parking assist control;

wherein at least one of the braking apparatus and the shift change apparatus is configured to execute a stopping control of stopping the vehicle when the malfunction occurs in the first electric power source device while the control unit executes the parking assist control;

wherein the braking apparatus executes a braking force control of applying the braking force to the wheels as the stopping control, and the shift change apparatus executes a shift control of changing the shift position to the parking position as the stopping control when the malfunction occurs in the first electric power source device while the control unit executes the parking assist control; and wherein the shift change apparatus is configured to start to execute the shift control after the braking apparatus starts to execute the braking force control.

4. The vehicle control apparatus according to claim 1, wherein the shift change apparatus is configured to stay execution of the shift control until a predetermined amount of time has elapsed after the malfunction occurs.

5. The vehicle control apparatus according to claim 1, wherein the index value is a ratio of a horizontal length of a distance which the vehicle has moved over a specified time and a vertical length of the distance which the vehicle has moved over the specified time.

* * * * *